United States Patent
Saki et al.

(10) Patent No.: US 12,198,057 B2
(45) Date of Patent: Jan. 14, 2025

(54) CONTEXT-BASED MODEL SELECTION

(71) Applicant: QUALCOMM Incorporated, San Diego, CA (US)

(72) Inventors: Fatemeh Saki, San Diego, CA (US); Yinyi Guo, San Diego, CA (US); Erik Visser, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1001 days.

(21) Appl. No.: 17/102,748

(22) Filed: Nov. 24, 2020

(65) Prior Publication Data

US 2022/0164662 A1  May 26, 2022

(51) Int. Cl.
| | |
|---|---|
| *G06N 3/082* | (2023.01) |
| *G06F 30/20* | (2020.01) |
| *G06V 20/10* | (2022.01) |
| *G10L 15/183* | (2013.01) |
| *G10L 15/20* | (2006.01) |
| *H04L 67/00* | (2022.01) |
| *H04W 4/02* | (2018.01) |

(52) U.S. Cl.
CPC .............. *G06N 3/082* (2013.01); *G06V 20/10* (2022.01); *G10L 15/183* (2013.01); *G10L 15/20* (2013.01); *H04L 67/34* (2013.01); *H04W 4/027* (2013.01)

(58) Field of Classification Search
CPC ....... G06V 20/10; G10L 15/183; G10L 15/20; H04L 67/34; H04W 4/027
USPC .......................................................... 703/17
See application file for complete search history.

(56) References Cited

U.S. PATENT DOCUMENTS

| | | |
|---|---|---|
| 4,827,521 A | 5/1989 | Bahl et al. |
| 8,463,648 B1 | 6/2013 | Bierner et al. |
| 9,165,556 B1 | 10/2015 | Sugar et al. |
| 9,412,361 B1 | 8/2016 | Geramifard et al. |
| 9,812,152 B2 | 11/2017 | Christian et al. |
| 10,026,401 B1 | 7/2018 | Mutagi et al. |
| 11,195,534 B1 * | 12/2021 | Shen ....................... G10L 17/00 |
| 2003/0028384 A1 | 2/2003 | Kemp et al. |
| 2005/0187770 A1 | 8/2005 | Kompe et al. |
| 2007/0033005 A1 | 2/2007 | Cristo et al. |
| 2007/0043574 A1 | 2/2007 | Coffman et al. |
| 2007/0050191 A1 | 3/2007 | Weider et al. |
| 2007/0183604 A1 | 8/2007 | Araki et al. |

(Continued)

FOREIGN PATENT DOCUMENTS

| | | | |
|---|---|---|---|
| EP | 3424046 A1 * | 1/2019 | ............. G10L 15/04 |
| EP | 3424046 B1 | 7/2020 | |

OTHER PUBLICATIONS

Heittola et al. (Context-dependent sound event detection, (13 pages)). (Year: 2013).*

(Continued)

*Primary Examiner* — Andre Pierre Louis
(74) *Attorney, Agent, or Firm* — QUALCOMM Incorporated; Espartaco Diaz Hidalgo

(57) ABSTRACT

A device includes one or more processors configured to receive sensor data from one or more sensor devices. The one or more processors are also configured to determine a context of the device based on the sensor data. The one or more processors are further configured to select a model based on the context. The one or more processors are also configured to process an input signal using the model to generate a context-specific output.

30 Claims, 15 Drawing Sheets

(56) References Cited

U.S. PATENT DOCUMENTS

| | | |
|---|---|---|
| 2009/0106022 A1 | 4/2009 | Madani |
| 2011/0166856 A1 | 7/2011 | Lindahl et al. |
| 2011/0173539 A1 | 7/2011 | Rottler et al. |
| 2012/0089396 A1 | 4/2012 | Patel et al. |
| 2014/0074466 A1 | 3/2014 | Sharifi et al. |
| 2014/0161270 A1 | 6/2014 | Peters et al. |
| 2014/0303972 A1* | 10/2014 | Gilbert .................. G10L 15/30 704/233 |
| 2015/0066479 A1 | 3/2015 | Pasupalak et al. |
| 2015/0213119 A1 | 7/2015 | Agarwal et al. |
| 2016/0012020 A1 | 1/2016 | George et al. |
| 2016/0176309 A1 | 6/2016 | Jeon et al. |
| 2016/0225389 A1 | 8/2016 | Jinnai et al. |
| 2016/0259775 A1 | 9/2016 | Gelfenbeyn et al. |
| 2017/0076727 A1 | 3/2017 | Ding et al. |
| 2017/0116986 A1 | 4/2017 | Weng et al. |
| 2017/0124818 A1 | 5/2017 | Ullrich et al. |
| 2017/0154176 A1 | 6/2017 | Yun et al. |
| 2017/0270919 A1 | 9/2017 | Parthasarathi et al. |
| 2017/0278514 A1 | 9/2017 | Mathias et al. |
| 2017/0323643 A1 | 11/2017 | Arslan et al. |
| 2018/0014790 A1* | 1/2018 | Falck .................. A61B 5/7264 |
| 2018/0121034 A1 | 5/2018 | Baker et al. |
| 2018/0144615 A1 | 5/2018 | Kinney et al. |
| 2018/0150897 A1 | 5/2018 | Wang et al. |
| 2018/0336000 A1* | 11/2018 | Vaughn ................ H04R 1/1083 |
| 2019/0050875 A1 | 2/2019 | McCord |
| 2019/0066693 A1 | 2/2019 | Ziv et al. |
| 2019/0103849 A1* | 4/2019 | Shaya ...................... H04R 3/12 |
| 2019/0130910 A1 | 5/2019 | Kariya et al. |
| 2019/0171409 A1 | 6/2019 | Boulanger et al. |
| 2019/0205395 A1 | 7/2019 | Bonin et al. |
| 2019/0206418 A1* | 7/2019 | Markovic ............... G10L 25/51 |
| 2019/0227096 A1 | 7/2019 | Chowdhary et al. |

OTHER PUBLICATIONS

Heittola T., et al., "Context-Dependent Sound Event Detection", Eurasip Journal on Audio, Speech, and Music Processing, vol. 2013, No. 1, Jan. 1, 2013 (Jan. 1, 2013), p. 1, XP055262984, pp. 1-13, DE ISSN: 1687-4722, DOI: 10.1186/1687-4722-2013-1, Abstract, Figures paragraphs [0001], [0003], [0004].

International Search Report and Written Opinion—PCT/US2021/072521—ISA/EPO—Mar. 23, 2022.

Taylor, B., et al., "Adaptive Deep Learning Model Selection on Embedded Systems", LCTES 2018, Computer Vision and Pattern Recognition, Jun. 2018, pp. 1-12.

Barchiesi D., et al., "Acoustic Scene Classification", IEEE Signal Processing Magazine, May 2015, vol. 32, No. 3, pp. 16-34.

Kingma D.P., et al., "ADAM: A Method for Stochastic Optimization", arXiv:1412.6980v9 [cs.LG], Jan. 30, 2017, International Conference for Learning Representations, 2015, pp. 1-15.

Krsmanovic F., et al., "Have we met? MDP Based Speaker ID for Robot Dialogue", Proceedings of Interspeech 2006, Sep. 17, 2006, XP055117559, table 3, section 2, 4 pages.

Salamon J., et al., "Deep Convolutional Neural Networks and Data Augmentation for Environmental Sound Classification", arXiv:1608.04363v2 [cs.SD], IEEE Signal Processing Letters, Accepted, Nov. 28, 2016, 5 pages.

Tax D.M.J., et al., "Support Vector Domain Description", Pattern Recognition Letters 20, Elsevier, 1999, pp. 1191-1199.

Yang E., et al., "Mitigating User Frustration through Adaptive Feedback Based on Human Automation Etiquette Strategies", Industrial Engineering, Iowa State University, 2016, 195 Pages.

* cited by examiner

CONTEXT-BASED MODEL SELECTION

I. FIELD

The present disclosure is generally related to context-based model selection.

II. DESCRIPTION OF RELATED ART

Advances in technology have resulted in smaller and more powerful computing devices. For example, there currently exist a variety of portable personal computing devices, including wireless telephones such as mobile and smart phones, tablets and laptop computers that are small, lightweight, and easily carried by users. These devices can communicate voice and data packets over wireless networks. Further, many such devices incorporate additional functionality such as a digital still camera, a digital video camera, a digital recorder, and an audio file player. Also, such devices can process executable instructions, including software applications, such as a web browser application, that can be used to access the Internet. As such, these devices can include significant computing capabilities, including, for example a sound event classification (SEC) system that attempts to recognize sound events (e.g., slamming doors, car horns, etc.) in an audio signal, a noise reduction system, an automatic speech recognition (ASR) system, a natural language processing (NLP) system, etc.

Systems to perform operations such as SEC, noise reduction, ASR, NLP, etc., can use models that are trained to provide broad applicability but that are difficult or expensive to update. For example, an SEC system is generally trained using a supervised machine learning technique to recognize a specific set of sounds that are identified in labeled training data. As a result, each SEC system tends to be domain specific (e.g., capable of classifying a predetermined set of sounds). After the SEC system is trained, it is difficult to update the SEC system to recognize new sound classes that were not identified in the labeled training data. Additionally, some sound classes that the SEC system is trained to detect may represent sound events that have more variants than are represented in the labeled training data. Although a user's experience can be improved by updating the models to improve accuracy for environments that the user's device is typically exposed to, the training involved to update the models can be time consuming and require large amounts of data, and the number of distinct classes (e.g., new distinct sounds for a SEC system) that the models are updated to recognize can rapidly grow to consume a large amount of memory at the device.

III. SUMMARY

In a particular aspect, a device includes one or more processors configured to receive sensor data from one or more sensor devices. The one or more processors are also configured to determine a context of the device based on the sensor data. The one or more processors are further configured to select a model based on the context. The one or more processors are also configured to process an input signal using the model to generate a context-specific output.

In a particular aspect, a method includes receiving, at one or more processors of a device, sensor data from one or more sensor devices. The method includes determining, at the one or more processors, a context of the device based on the sensor data. The method includes selecting, at the one or more processors, a model based on the context. The method also includes processing, at the one or more processors, an input signal using the model to generate a context-specific output.

In a particular aspect, a device includes means for receiving sensor data. The device includes means for determining a context based on the sensor data. The device includes means for selecting a model based on the context. The device also includes means for processing an input signal using the model to generate a context-specific output.

In a particular aspect, a non-transitory computer-readable storage medium includes instructions that when executed by a processor, cause the processor to receive sensor data from one or more sensor devices. The instructions, when executed by the processor, cause the processor to determine a context on the sensor data. The instructions, when executed by the processor, cause the processor to select a model based on the context. The instructions, when executed by the processor, also cause the processor to process an input signal using the model to generate a context-specific output.

Other aspects, advantages, and features of the present disclosure will become apparent after review of the entire application, including the following sections: Brief Description of the Drawings, Detailed Description, and the Claims.

IV. BRIEF DESCRIPTION OF THE DRAWINGS

V. DETAILED DESCRIPTION

Figure 1:
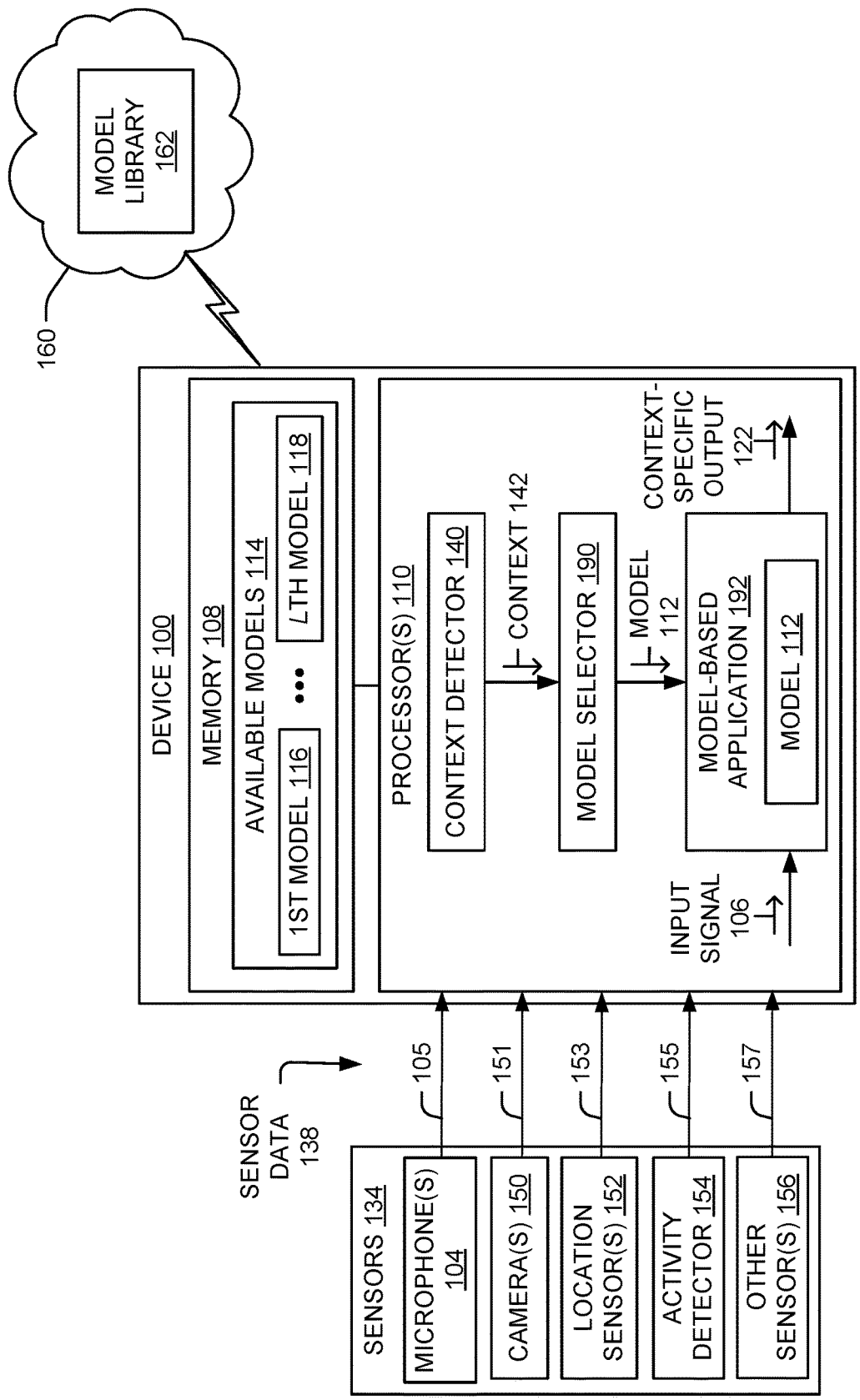
FIG. 1 is a block diagram of an example of a system that includes a device configured to perform context-based model selection, in accordance with some examples of the present disclosure.

Systems to perform operations such as SEC, noise reduction, ASR, NLP, etc., can use models that are trained to provide broad applicability but that are difficult or expensive to update. Although a user's experience can be improved by updating the models to improve accuracy for environments that the user, or user's device, is typically exposed to, re-training such models can be time consuming and require large amounts of data. In addition, as the user encounters an increasing number of environments and situations in everyday life, updating the models to adapt to the new environments and situations can cause the models to consume an ever-increasing amount of memory.

The disclosed systems and methods use context-aware model selection to select from among multiple models based on the context (e.g., the acoustic environment) in which the selected model is to be used, according to some aspects. For example, a proper acoustic model can be selected for a particular acoustic environment to deliver a better user experience in most voice user interface applications. As an illustration, in order to provide a user of a hearing aid device with a pleasant listening experience, the surrounding noise should be properly estimated. An appropriate model can be selected based on the particular location of the user, such as a particular street corner, building, or restaurant, or based on a type of environment of the user, such as in a vehicle, in a park, or in a metro station, as illustrative, non-limiting examples. A particular context can be identified based on one or more of a variety of techniques, such as via location data (e.g., from a global positioning system (GPS) system), activity detection data, camera recognition, audio classification, user input, one or more other techniques, or any combination thereof.

According to some aspects, the acoustic characteristics of noisy areas such as shopping malls, restaurants, stadiums, etc., may be known, and their models are made publicly available for users. As a user walks into any of these locations, the access permission to the model of that location could be granted to the user. After the user leaves, the model may be removed or "pruned" from the user's device. In another aspect, as a user travels from place to place (e.g., driving, walking, or via public transit), the user's device may swap models so that the most appropriate model can be used for each location or setting that the user encounters. In some aspects, a library of available models is provided to enable searching and download of an appropriate model. Some of the models may be uploaded by other users, such as updated models that have been trained based on exposure of the other users' devices to various environments, and may be publicly available (or available with specific access permissions) as part of a crowdsourced, context-aware model library.

According to a particular aspect, models can be combined or "generalized" by grouping relevant categories of classes into one model and creating an ensemble of various source models. For example, in SEC applications, relevant sound classes can be grouped based on location, sound type, or one or more other characteristics. To illustrate, one model can include a group of sound classes to be generally representative of crowed areas, such as public squares, shopping malls, subways, etc., while another model can include a group of sound classes related to home activities. These generalized models enable generally improved performance based on the broad category of the generalized model, while using reduced memory as compared to the amount of memory used for multiple specific models to accommodate each specific environment or activity. In addition, if specific models are unavailable due to privacy issues or other accessibility limitations, the more general models may be used instead. For example if a user arrives a busy restaurant that does not have a specific public model for that restaurant available for use, a general purpose model for crowded areas, or a general model for crowded restaurants, can be downloaded to the user's device and used instead.

By changing models based on the context of a device, systems that use such models can perform with higher accuracy as compared to using a single model for all contexts. Further, changing models enables such systems to perform with increased accuracy without incurring the power consumption, memory requirements, and processing resource usage associated with re-training an existing model from scratch at the device for a particular context. Use of generalized context-based models enables improved performance of systems as compared to using default models and also enables reduced bandwidth, memory, and processing resource usage as compared to downloading and switching between multiple high-accuracy, context-specific models. In addition, operation of such systems using context-based models enables improved operation of the device itself, such as by enabling faster convergence when performing an iterative or dynamic process (e.g., in a noise cancellation technique) due to using a higher-accuracy model that is specific to the particular context.

Particular aspects of the present disclosure are described below with reference to the drawings. In the description, common features are designated by common reference numbers. As used herein, various terminology is used for the purpose of describing particular implementations only and is not intended to be limiting of implementations. For example, the singular forms "a," "an," and "the" are intended to include the plural forms as well, unless the context clearly indicates otherwise. Further, some features described herein are singular in some implementations and plural in other implementations. To illustrate, FIG. 1 depicts a device 101 that includes one or more processor ("processor(s) 110 in FIG. 1), which indicates that in some implementations the device 101 includes a single processor 110 and in other implementations the device 101 includes multiple processors 110. For ease of reference herein, such features are generally introduced as "one or more" features and are subsequently referred to in the singular or optional plural (generally indicated by terms ending in "(s)") unless aspects related to multiple of the features are being described.

The terms "comprise," "comprises," and "comprising" are used herein interchangeably with "include," "includes," or "including." Additionally, the term "wherein" is used interchangeably with "where." As used herein, "exemplary" indicates an example, an implementation, and/or an aspect, and should not be construed as limiting or as indicating a preference or a preferred implementation. As used herein, an ordinal term (e.g., "first," "second," "third," etc.) used to modify an element, such as a structure, a component, an operation, etc., does not by itself indicate any priority or order of the element with respect to another element, but rather merely distinguishes the element from another element having a same name (but for use of the ordinal term). As used herein, the term "set" refers to one or more of a particular element, and the term "plurality" refers to multiple (e.g., two or more) of a particular element.

As used herein, "coupled" may include "communicatively coupled," "electrically coupled," or "physically coupled," and may also (or alternatively) include any combinations thereof. Two devices (or components) may be coupled (e.g., communicatively coupled, electrically coupled, or physically coupled) directly or indirectly via one or more other devices, components, wires, buses, networks (e.g., a wired network, a wireless network, or a combination thereof), etc. Two devices (or components) that are electrically coupled may be included in the same device or in different devices and may be connected via electronics, one or more connectors, or inductive coupling, as illustrative, non-limiting examples. In some implementations, two devices (or components) that are communicatively coupled, such as in electrical communication, may send and receive electrical signals (digital signals or analog signals) directly or indirectly, such as via one or more wires, buses, networks, etc. As used herein, "directly coupled" refers to two devices that are coupled (e.g., communicatively coupled, electrically coupled, or physically coupled) without intervening components.

In the present disclosure, terms such as "determining," "calculating," "estimating," "shifting," "adjusting," etc. may be used to describe how one or more operations are performed. It should be noted that such terms are not to be construed as limiting and other techniques may be utilized to perform similar operations. Additionally, as referred to herein, "generating," "calculating," "estimating," "using," "selecting," "accessing," and "determining" may be used interchangeably. For example, "generating," "calculating," "estimating," or "determining" a parameter (or a signal) may refer to actively generating, estimating, calculating, or determining the parameter (or the signal) or may refer to using, selecting, or accessing the parameter (or signal) that is already generated, such as by another component or device.

FIG. 1 is a block diagram of an example of a system that includes a device 100 that is configured to perform context-based model selection. The device 100 includes one or more processors 110 coupled to a memory 108. The memory 108 includes L available models 114 (L is an integer greater than 1) that may be selected by the one or more processors 110, illustrated as a first model 116 and one or more additional models including a Lth model 118.

The one or more processors 110 are configured to receive sensor data 138 from one or more sensor devices 134 and to determine a context 142 of the device 100 based on the sensor data 138. Although the sensor devices 134 are illustrated as coupled to the device 100, in other implementations one or more (or all) of the sensor devices 134 are integrated with or included in the device 100.

The one or more sensor devices 134 include one or more microphones 104 coupled to the one or more processors 110, and the sensor data 138 includes audio data 105 from the one or more microphones 104. In an example, the audio data 105 corresponds to an audio scene, and the context 142 is at least partially based on audio scene. To illustrate, based on the amount and type of noise detected in the audio data, as well as acoustic characteristics such as echoes and absorption, the audio scene can indicate that the device 100 is in a confined noisy space, a large enclosed space, a large outdoor space, a traveling vehicle, etc.

The one or more sensor devices 134 include a location sensor 152 coupled to the one or more processors 110, and the sensor data 138 includes location data 153 from the location sensor 152, such as global positioning sensor that provides global position data for the device 100. In an example, the location data 153 is indicative of a location of the device 100, and the context 142 is at least partially based on the location.

The one or more sensor devices 134 include a camera 150 coupled to the one or more processors 110, and the sensor data 138 includes image data 151 (e.g., still image data, video data, or both) from the camera 150. In an example, the image data 151 corresponds to a visual scene, and the context 142 is at least partially based on the visual scene.

The one or more sensor devices 134 includes an activity detector 154 coupled to the one or more processors 110, and the sensor data 138 includes motion data, such as the activity data 155 from the activity detector 154. In an example, the motion data corresponds to motion of the device 100, and the context 142 is at least partially based on the motion of the device 100.

The one or more sensor devices 134 may also include one or more other sensors 156 that provide additional sensor data 157 to the one or more processors 110 for use in determining the context 142. The other sensor(s) 156 can include, for example, an orientation sensor, a magnetometer, a light sensor, a contact sensor, a temperature sensor, or any other sensor that is coupled to or included within the device 100 and that can be used to generate sensor data 157 useful for determining the context 142 associated with the device 100 at a particular time. As another example, the other sensor(s) 156 can include a wireless network detector that can be used to determine the context 142, such as by detecting when the device 100 is in the vicinity of recognized wireless network locations (e.g., by detecting a home or business WiFi network, or a Bluetooth network associated with a friend of family member of a user of the device 100).

The one or more processors 110 include a context detector 140, a model selector 190, and a model-based application 192. In a particular implementation, the context detector 140 is a neural network that is trained to determine the context 142 based on the sensor data 138. In other implementations, the context detector 140 is a classifier that trained using a different machine-learning technique. For example, the context detector 140 may include or correspond to a decision tree, a random forest, a support vector machine, or another classifier that is trained to generate output indicating the context 142 based on the sensor data 138. In still other implementations, the context detector 140 uses heuristics to determine the context 142 based on the sensor data 138. In yet other implementations, the context detector 140 uses a combination of artificial intelligence and heuristics to determine the context 142 based on the sensor data 138. For example, the sensor data 138 may include image data, video data, or both, and the context detector 140 may include an image recognition model that is trained using a machine-learning technique to detect particular objects, motions, backgrounds, or other image or video information. In this example, output of the image recognition model may be evaluated via one or more heuristics to determine the context 142.

The model selector 190 is configured to select a model 112 based on the context 142. In some implementations, the model 112 is selected from among the multiple available models 114 stored at the memory 108. In some implementations, the model 112 is selected from a model library 162 that is accessible via a network 160, such as a cloud-based library of models available for searching and download. An example of the model library 162 is described in further detail with respect to FIG. 2.

As used herein, "downloading" and "uploading" a model includes transferring of data (e.g., compressed data) corresponding to the model over a wired link, over a wireless link, or a combination thereof. For example, wireless local area networks ("WLANs") may be used in place of, or in addition to, wired networks. Wireless technologies, such as Bluetooth® ("Bluetooth") and Wireless Fidelity "Wi-Fi" or variants of Wi-Fi (e.g. Wi-Fi Direct), enable high speed communications between mobile electronic devices (e.g., cellular phones, watches, headphones, remote controls, etc.) that are within relatively short distances of one another (e.g., 100 to 200 meters or less depending on the specific wireless technology). Wi-Fi is often used to connect and exchange information between a device with an access point, (e.g. a router) and devices that are Wi-Fi enabled. Examples of such devices are smart televisions, laptops, thermostats, personal assistant devices, home automation devices, wireless speakers and other similar devices. Similarly, Bluetooth is also used to couple devices together. Example of such are mobile phones, computers, digital cameras, wireless headsets, keyboards, mice or other input peripherals, and similar devices.

Devices (e.g., those previously mentioned) may have both Bluetooth and Wi-Fi capabilities, or other wireless means to communicate with each other. Inter-networked devices may have wireless means to communicate with each other and may also be connected based on different cellular communication systems, such as, a Long Term Evolution (LTE) system, a Code Division Multiple Access (CDMA) system, a Global System for Mobile Communications (GSM) system, a wireless local area network (WLAN) system, or some other wireless system. A CDMA system may implement Wideband CDMA (WCDMA), CDMA 1X, Evolution-Data Optimized (EVDO), Time Division Synchronous CDMA (TD-SCDMA), or some other version of CDMA. As used herein, "wireless" refers to one or more of the above-listed technologies, one or more other technologies that enable transfer of information other than via wires, or a combination thereof.

The model-based application 192 is configured to process an input signal 106 using the selected model 112 to generate a context-specific output 122. Although a single model-based application 192 is illustrated, in other implementations the one or more processors 110 can execute multiple model-based applications 192 using various models 112 selected based on the context 142 to perform various operations.

For example, in some implementations, the model 112 includes a sound event detection model, and the input signal 106 includes an audio signal, such as the audio data 105 from the microphone 104, audio data retrieved from an audio file at the memory 108, an audio signal received via wireless transmission, such as a phone call or streaming audio session, or any combination thereof. The model-based application 192 is configured to process the input signal 106 using the sound event detection model to generate the context-specific output 122 that includes a classification of a sound event in the audio signal.

In some implementations, the model 112 includes a noise reduction model, and the input signal 106 includes an audio signal such as the audio data 105 from the microphone 104, audio data retrieved from an audio file at the memory 108, an audio signal received via wireless transmission, such as a phone call or streaming audio session, or any combination thereof. The model-based application 192 is configured to process the input signal 106 using the noise reduction model to generate the context-specific output 122 that includes a noise reduced audio signal based on the audio signal.

In some implementations, the model 112 includes an automatic speech recognition (ASR) model, and the input signal 106 includes an audio signal such as the audio data 105 from the microphone 104, audio data retrieved from an audio file at the memory 108, an audio signal received via wireless transmission, such as a phone call or streaming audio session, or any combination thereof. The model-based application 192 is configured to process the input signal 106 using the ASR model to generate the context-specific output 122 that includes text data representative of speech in the audio signal.

In some implementations, the model 112 includes a natural language processing (NLP) model, and the input signal 106 includes text data, such as text data generated by an NLP model, user keyboard input, text message, etc. The model-based application 192 is configured to process the input signal 106 using the NLP model to generate the context-specific output 122 that includes NLP output data based on the text data.

In some implementations, the model 112 is associated with an automatic adjustment of a device operating mode. For example, the model 112 can map or otherwise associate user inputs (e.g., voice commands, gestures, touchscreen selections, etc.) to operating mode adjustments based on the context 142. To illustrate, when the model 112 is selected based on the context 142 corresponding to a public area, the model 112 can cause the model-based application 192 to map a user command "play music" to a playback operation at the user's earphones, and the context-specific output 122 can include a signal to adjust the device operating mode to initiate an audio playback operation and to route the output audio signal to the user's earphones. However, when the model 112 is selected based on the context 142 corresponding to the user's house, the model 112 can cause the model-based application 192 to map the "play music" command to a playback operation at the user's home entertainment system, and the context-specific output 122 can include a signal to adjust the device operating mode to initiate the audio playback and to route the output audio signal to loudspeakers of the home entertainment system.

In some implementations, the model selector 190 is configured to prune the model 112 in response to detection of a change in the context 142, such as when the change in the context 142 results in the model 112 no longer being appropriate for the changed context 142 or less appropriate for the changed context 142 than another available model. As used herein, "pruning" a model includes removing the model from use, such as by replacing the model with another model at the model-based application 192, permanently deleting the model from the memory 108, deleting the model from the model-based application 192, marking the model as unused, otherwise rendering the model inaccessible (e.g., by deleting access permission for the model as described further with reference to FIG. 2), or a combination thereof. In some implementations, pruning a model can reduce memory usage, processor cycles, one or more other processing or system resources, or a combination thereof, and may therefore improve functioning (e.g., increased speed, reduced power consumption) of the one or more processors 110 or of the device 100 overall. In implementations in which a model has been updated at the device 100, pruning the model can include preserving updates to the model. For example, if a sound model has been created or modified during use at the device 100 to identify new sound classes, such as described with reference to FIGS. 3-5, the new sound classes may be preserved, such as in the memory 108 or uploaded to the model library 162, as illustrative, non-limiting examples.

During operation, the context detector 140 monitors the sensor data 138 and may update the context 142 based on detecting changes in the sensor data 138. In response to a change of the context 142, the model selector 190 accesses the available models 114 in the memory 108, in the model library 162, or both, to select one or more models that may be more appropriate for the updated context 142 than the current model 112. For example, the model selector 190 may send a query to the model library 162 that identifies one or more aspects of the context 142, such as a geographic location, a venue name, an acoustic scene or visual scene description, one or more other aspects, or a combination thereof. The model selector 190 may receive results of the query, select a particular model based on the query results, and cause the device 100 to download the particular model from the model library 162 and store the downloaded model in the memory 108. In some implementations, in response to detecting that the context 142 has changed, the currently selected model 112 is pruned (e.g., the model selector 190 removes the model 112 from use by the model-based application 192) and replaced with the downloaded model from the memory 108.

By changing models based on the context 142, the device 100 may execute the model-based application 192 with higher accuracy as compared to using a single default model. As a result, a user experience with the device 100 may be improved.

In some implementations, the device 100 is also configured to modify or customize the selected model 112 to further improve accuracy, such as in response to detection of a new sound event or variations of an existing classification that may not be accurately identified by the model 112. Examples of modifying the model 112 based on data acquired at the device 100 (e.g., the sensor data 138) are described further with regard to FIGS. 3-5. After modifying the model 112, the device 100 may upload the modified model 112 to the model library 162 to be available to other devices. In some implementations, the model 112 includes a trained model uploaded to the library 162 from another user device. Thus, the device 100 may utilize and contribute to a crowdsourced library of models in a distributed context-aware system.

The device 100 may include, correspond to, or be included within a voice activated device, an audio device, a wireless speaker and voice activated device, a portable electronic device, a car, a vehicle, a computing device, a communication device, an internet-of-things (IoT) device, a virtual reality (VR) device, an augmented reality (AR) device, a mixed reality (MR) device, a hearing aid device, a smart speaker, a mobile computing device, a mobile communication device, a smart phone, a cellular phone, a laptop computer, a computer, a tablet, a personal digital assistant, a display device, a television, a gaming console, an appliance, a music player, a radio, a digital video player, a digital video disc (DVD) player, a tuner, a camera, a navigation device, or any combination thereof. In a particular aspect, the one or more processors 110, the memory 108, or a combination thereof, are included in an integrated circuit. Various implementations that include aspects of the device 100 are described further with reference to FIGS. 7-16.

Although the device 100 is described as storing the available models 114 in the memory 108 and accessing the model library 162, in other implementations the device 100 may not store models at the memory 108 and may instead retrieve models from the model library 162 in response to detecting changes in the context 142. In other implementations, the device 100 operates without accessing the model library 162 and instead selects from among the available models 114 at the memory 108. In some implementations, the available models 114 at the memory 108 represent a locally stored portion of a distributed context-aware system and may be accessible to other devices as part of the model library 162, such as in a peer-to-peer model sharing configuration.

Although the sensors 134 are illustrated as including the microphone(s) 104, the camera(s) 150, the location sensor(s) 152, the activity detector 154, and the other sensor(s) 156, in other implementations one or more of the microphone(s) 104, the camera(s) 150, the location sensor(s) 152, the activity detector 154, or the other sensor(s) 156 are omitted. In an illustrative example, the context detector 140 operates using only the audio data 105, the image data 151, the location data 153, the activity data 155, or the other sensor data 157. In another illustrative example, the context detector 140 operates using two of the audio data 105, the image data 151, the location data 153, the activity data 155, and the other sensor data 157, using three of the audio data 105, the image data 151, the location data 153, the activity data 155, and the other sensor data 157, or using four of the audio data 105, the image data 151, the location data 153, the activity data 155, and the other sensor data 157.

Although the context detector 140, the model selector 190, and the model-based application 192 are described as separate components, in other implementations, the context detector 140 and the model selector 190 are combined into a single component, the model selector 190 and the model-based application 192 are combined into a single component, or the context detector 140, the model selector 190, and the model-based application 192 are combined into a single component. In some implementations, each of the context detector 140, the model selector 190, and the model-based application 192 may be implemented via processor-executed instructions, dedicated hardware or circuitry, or a combination of both.

Figure 2:
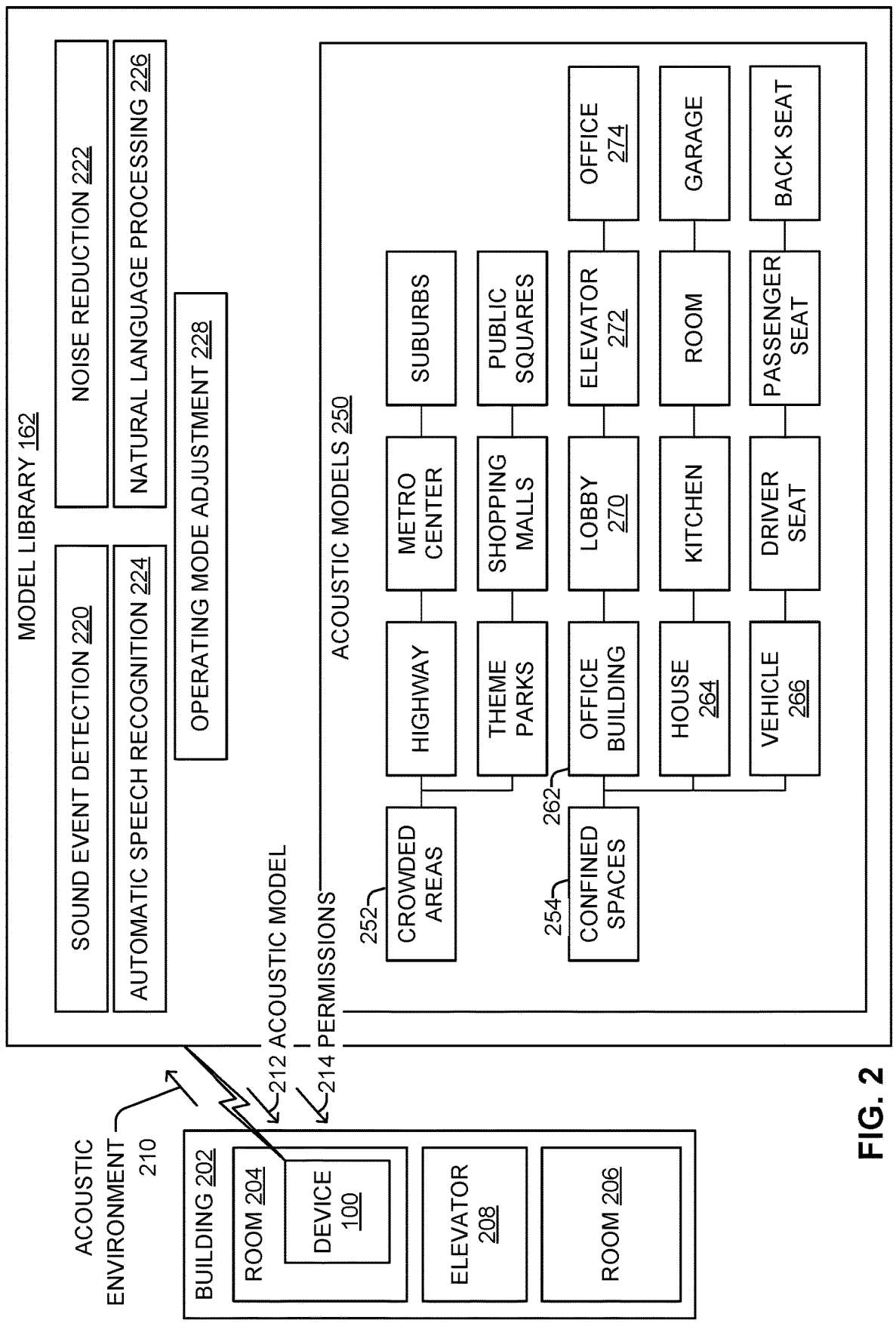
FIG. 2 is a diagram that illustrates aspects of operation of components of FIG. 1, in accordance with some examples of the present disclosure.

FIG. 2 illustrates a particular example of aspects of operation of the device 100 and the model library 162. The device 100 is illustrated within a building 202 that includes a room 204, a room 206, and an elevator 208, such as an office building. The device 100 is in wireless communication with the model library 162.

The model library 162 includes various types of models, such as a representative sound event detection model 220, a representative noise reduction model 222, a representative ASR model 224, a representative NLP model 226, a representative operating mode adjustment model 228, and various acoustic models 250. Although a single one of each of the sound event detection model 220, the noise reduction model 222, the ASR model 224, the NLP model 226, and the operating mode adjustment model 228 is illustrated for clarity of illustration, it should be understood that the model library 162 can include multiple versions of each of the different types of models, such as models that have been trained for different contexts, different personalization, and different levels of generality, in a similar manner as described below for the acoustic models 250.

The acoustic models 250 are illustrated in an arrangement in which models for general categories (e.g., generalized models) are depicted as roots of tree structures, and models for more specific contexts are depicted as branches or as leaves of the tree structures. For example, a "crowded areas" model 252 is a general category model with branches including "highway" model(s), "metro center" model(s), "suburbs" model(s), "theme parks" model(s), "shopping malls" model(s), and "public squares" model(s). Although not illustrated, each of the branch models may serve as a general category model for various more specific models. For example, the model library 162 may include acoustic models for multiple specific theme parks. If a user's device (e.g., the device 100) is at a particular theme park, the device may request an acoustic model for that particular theme park. If no acoustic model is available for that particular theme park, the user's device may request a "theme parks" model that is applicable to theme parks generally but not specifically for any particular theme park. If a "theme parks" model is not available, the user's device may request a "crowded areas" model that is applicable to crowded areas generally but not specially to theme parks. Thus, the user's device can search for and select a most specific model that is available in the model library 162 for that device's particular context.

The acoustic models 250 also include a "confined spaces" model 254 that is a general category model with branches corresponding to an "office building" model 262, a "house" model 264, and a "vehicle" model 266. The "office building" model 262 is a general category model for various locations within office buildings. More specific models for various locations within office buildings include a "lobby" model 270, an "elevator" model 272, and an "office" model 274. The "house" model 264 is a general category model for various locations within houses. More specific models for locations within houses include a "kitchen" model, a "room" model, and a "garage" model. The "vehicle" model 266 is a general category model for various locations within a vehicle. More specific models for locations within vehicles include a "driver seat" model, a "passenger seat" model, and a "back seat" model.

It should be understood that the illustrated models are depicted for purposes of illustration and clarity of explanation. In other implementations, the model library 162 may have any number of models (e.g., hundreds, thousands, millions, etc.) arranged at any number of levels of generality, for any number of different contexts, for any number of different applications. It should also be understood that although the acoustic models 250 are organized according to a tree structure, in other implementations the model library 162 utilizes one or more other data structures or categorization techniques in place of, or in addition to, a tree structure.

As illustrated, the device 100 determines, based on the sensors 134, that the context 142 of the device 100 is within the room 204. The device 100 may determine whether the available acoustic models 250 of the model library 162 include an acoustic model that is specific to the particular acoustic environment associated with the context 142 and that is available to the device 100 (e.g., the model selector 190). For example, the device 100 transmits data indicative of the acoustic environment 210 of the device 100, such as location data, a name of the building 202, a general description of the building 202 (e.g., "office building"), a general description of the room 204 (e.g., "office"), or any combination thereof. In a particular implementation, in response to the model library 162 having no acoustic model that is specific to the particular acoustic environment 210 and available to the one or more processors 110, the device 100 (e.g., the model selector 190) determines whether an acoustic model for a general category of the particular acoustic environment 210 is available.

As an illustrative example, the device 100 may send data indicative of the acoustic environment 210 by transmitting the location coordinates of the device 100. If the model library 162 has an acoustic model that is specific to (e.g., matches) the location of the device 100 (e.g., an acoustic model that corresponds to a geo-fence of a region that contains the location of the device 100), the device 100 downloads an acoustic model 212 corresponding to the location. Otherwise, in response to the model library 216 not having a model specific to the location coordinates (e.g., not specific to the building 202), the device 100 may transmit additional data indicative of the acoustic environment 210, such as an "office" descriptor of the room 204. In response to a determination that the model library 162 includes the "office" model 274 as available to the device 100, the device 100 downloads the "office" model 274 as the acoustic model 212 for use within the room 204. In the event the "office" model 274 is not available, the device 100 may request the more general "office building" model 262, or the even more general "confined spaces" model 254. In some implementations, the model library 162 is configured to automatically locate and transmit to the device 100 the most specific model corresponding to the acoustic environment 210, instead of the device 100 sending a series of requests for increasingly more generalized models until an appropriate model is located.

In some implementations, the device 100 may also receive one or more access permissions 214 that authorize the device 100 to access the acoustic model 212. The access permissions 214 may enable embargoing of models that the device 100 is predicted to use. For example, embargoed models may be downloaded from the model library 162 to the memory 108 of the device 100 in advance of the predicted use. Downloading such models in advance may be scheduled based on available bandwidth (e.g., during periods of reduced network traffic) or to reduce the latency of accessing the models when the context 142 of the device 100 is detected to have changed. Each of the embargoed models remains inaccessible (e.g., encrypted) at the memory 108 until a corresponding permission 214 (e.g., an encryption key) for the model is received from the model library 162 or another permissions management system. For example, the device 100 may receive an access permission 214 for the model 112 at least partially based on the location of the device 100 matching the particular location associated with the model 112 (e.g., a particular location).

In a particular example, the device 100 transmits data indicating the acoustic environment 210 of the room 204, receives the "office" model 274 (and any associated access permissions 214) from the model library 162, stores a copy of the "office" model 274 at the memory 108, and uses the "office" model 274 at the model-based application 197, such as to perform noise reduction. When the device 100 is moved from the room 204 to the elevator 208 within the building 202, the device 100 detects the new context 142 and requests an acoustic model for the acoustic environment 210 corresponding to the elevator 208. In response, the "elevator" model 272 is transmitted to the device 100 as the acoustic model 212, and access permissions 214 for the "elevator" model 272 may also be transmitted. The device 100 replaces the "office" model 274 with the "elevator" model 272 at the model-based application 192. In some implementations, the device 100 removes the "office" model 274 from the memory 108, such as when available storage capacity at the memory 108 is restricted.

Upon exiting the elevator 208 and entering the room 206, the device 100 may search the available models 114 at the memory 108 for the "office" model 274. If the "office" model is not available at the memory 108, the device 100 transmits data indicating the acoustic environment 210 of the room 206, receives the "office" model 274 (and any associated access permissions 214) from the model library 162, stores a copy of the "office" model 274 at the memory 108, and uses the "office" model 274 at the model-based application 197. Thus, as the device 100 moves from one location to the next, models are switched out for more appropriate models for the changing context 142 of the device 100. In some implementations, when the device 100 exits the building 202, any stored models in the memory 108 that are specific to the building 202 may be deleted or archived to conserve storage space in the memory 108 or may be rendered inaccessible in response to the access permissions 214 imposing a geographical or other restriction on the use of the models.

In conjunction with various aspects described with reference to FIG. 1 and FIG. 2, the device 100 includes the one or more processors 110 configured to select an acoustic model corresponding to a particular room, of a building, in which the device 100 is located, such as the acoustic model 212 corresponding to the room 204 of the building 202, and process an input audio signal using the acoustic model 212. For example, the input signal 106 can include the audio data 105 that is generated by the microphone(s) 104 and that is processed at the model-based application 192 to preform noise reduction.

In some implementations, the one or more processors 110 are configured to download the acoustic model 212 from the library 162 of acoustic models in response to a determination that the device 100 has entered the particular room 204. In some implementations, the one or more processors 110 are further configured to remove the acoustic model 212 in response to the device 100 leaving the particular room 204. As non-limiting examples, removing the acoustic model 212 can include replacing the acoustic model 212 with another model at the model-based application 192, deleting the acoustic model 212 from the memory 108, deleting the acoustic model 212 from the model-based application 192, marking the acoustic model 212 as unused, or rendering the acoustic model 212 inaccessible (e.g., deleting the access permission 214 for the acoustic model 212).

The one or more sensor devices 134 (also referred to as "sensors 134") coupled to the one or more processors 110 are configured to generate the sensor data 138 indicative of a location of the device 100, and the one or more processors 110 are configured to select the acoustic model 212 based on the sensor data 138. For example, the device 100 can include a modem, as described with reference to FIG. 6, that is coupled to the one or more processors 110 and configured to receive the location data 153 indicative of a location of the device 100, and the one or more processors 110 are configured to select the acoustic model 212 based on the location data 153.

In some implementations, selection of models can be performed predictively based on the context 142. For example, based on the sensor data 138 (e.g., activity detection, GPS analysis, camera recognition, audio classification, or a combination thereof), the one or more processors 110 may determine that a user of the device 100 is traveling to a new location (e.g., New York City) where assistive Internet-of-Things (IoT) devices associated with the user can exhibit improved performance with updated settings for the new location. As a result, appropriate source models (e.g., an acoustic model for traffic) can be retrieved from the memory 108 or from one or more model libraries (e.g., the model library 162) and used. Upon leaving the new location, the source models for the new location are removed and the prior source models may be restored.

In conjunction with various aspects described with reference to FIG. 1 and FIG. 2, in response to the device 100 entering a vehicle, such as described further with reference to FIG. 7, the one or more processors 110 are configured to select a personalized acoustic model for a user of the device 100 from among multiple personalized acoustic models corresponding to the vehicle and process an input audio signal using the personalized acoustic model. For example, the device 100 may train or otherwise generate models specific to particular users of the device 100, as described in further detail with reference to FIGS. 3-5, and may access the personalized acoustic models from the model library 162, the memory 108, or both. To illustrate, the one or more processors 110 may be configured to download the personalized acoustic model from a library of acoustic models (e.g., the acoustic models 250 in the model library 162) in response to a determination that the device 100 has entered the vehicle. In some implementations, the one or more processors 110 are further configured to remove the personalized acoustic model in response to the device 100 leaving the vehicle.

For example, the one or more processors 110 may be configured to determine the device 100 has entered the vehicle based on the sensor data 138. To illustrate, the one or more processors 110 may to determine the device 100 has entered the vehicle (or exited the vehicle) based on the location data 153.

In conjunction with various aspects described with reference to FIG. 1 and FIG. 2, the one or more processors 110 of the device 100 are configured to download an acoustic model corresponding to a particular location in which the device 100 is located, process an input audio signal using the acoustic model, and remove the acoustic model in response to the device 100 exiting the location. In an illustrative example, the location corresponds to a particular restaurant, and the acoustic model is downloaded from a library of acoustic models (e.g., the acoustic models 250 in the model library 162) in response to a determination that the device 100 has entered the particular restaurant.

In conjunction with various aspects described with reference to FIG. 1 and FIG. 2, the one or more processors 110 of the device 100 are configured to select an acoustic model corresponding to a particular location, receive an access permission for the acoustic model at least partially based on a location of the device 100 matching the particular location, and process an input audio signal using the acoustic model.

Figure 3:
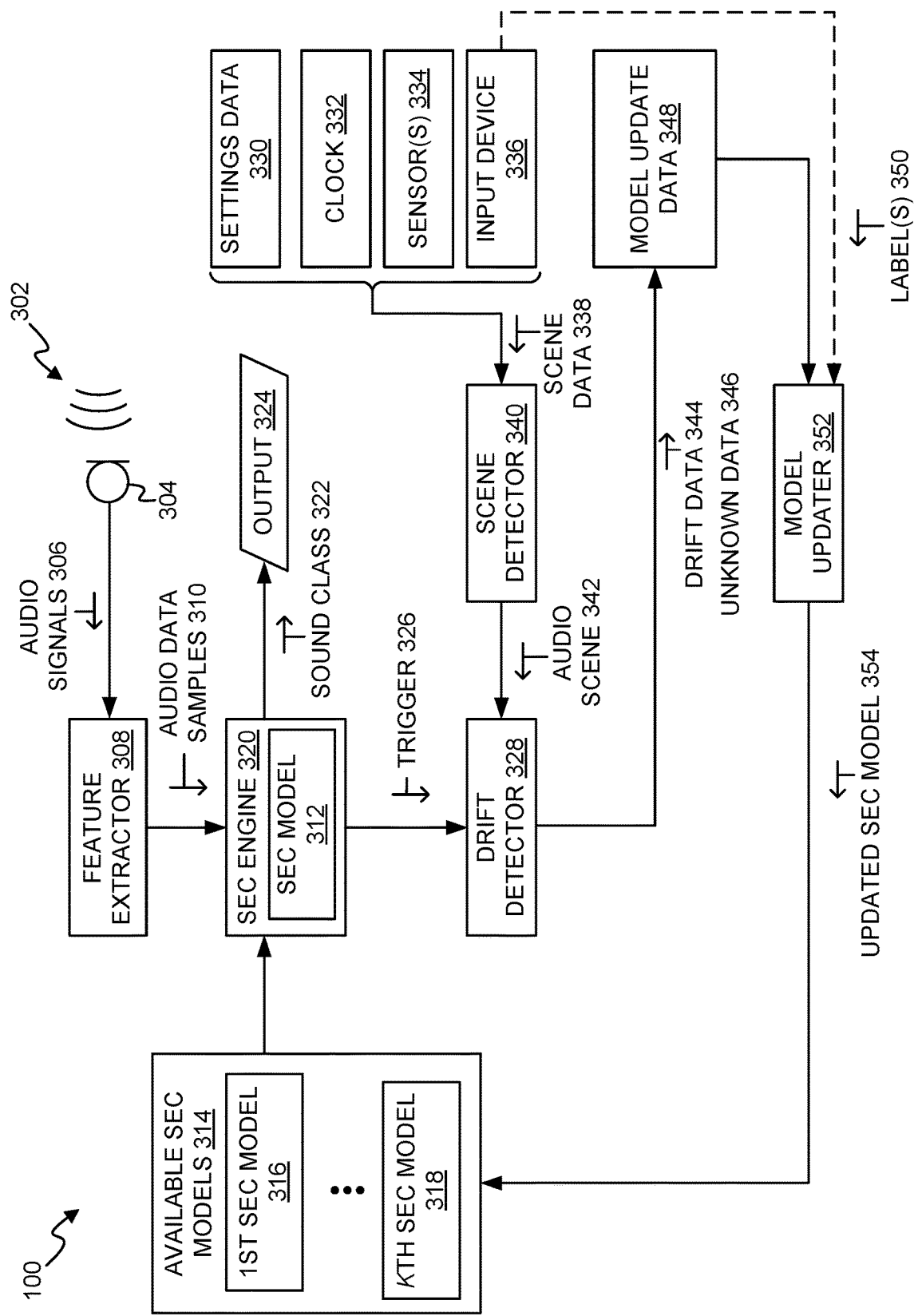
FIG. 3 is a diagram that illustrates aspects of updating a model that may be performed by the device of FIG. 1, in accordance with some examples of the present disclosure.
Figure 5:
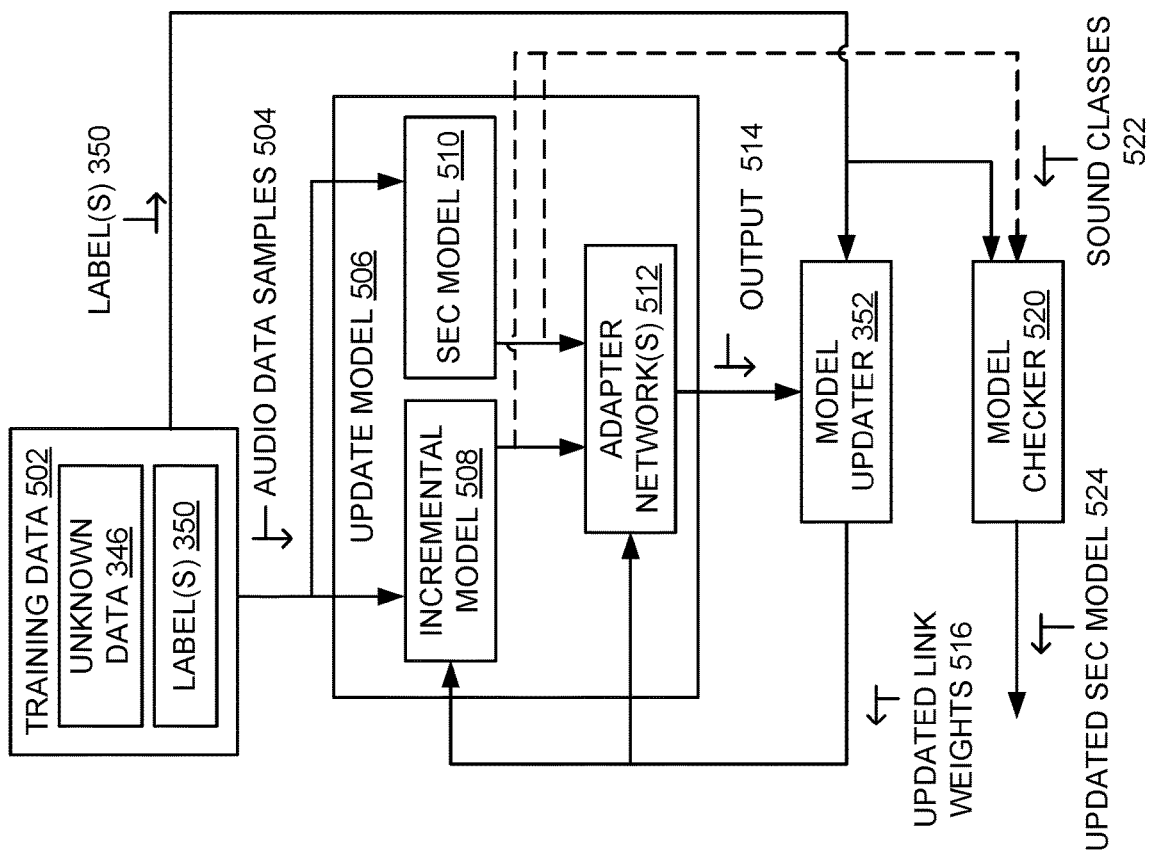
FIG. 5 is a diagram that illustrates aspects of updating a sound event classification model to account for new sound classes, in accordance with some examples of the present disclosure.
Figure 4:
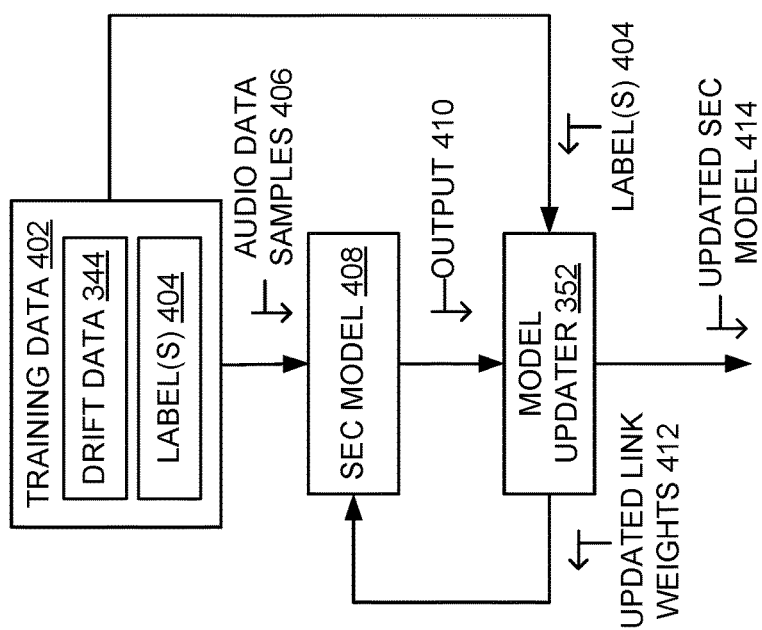
FIG. 4 is a diagram that illustrates aspects of updating a sound event classification model to account for drift, in accordance with some examples of the present disclosure.

In some implementations, the device 100 of FIG. 1 and FIG. 2 is further configured to update one or more models, such as to personalize the models for particular users or to improve the accuracy of the models for environments the device 100 frequently encounters, as illustrative, non-limiting examples. FIGS. 3-5 depict illustrative examples in which the device 100 is configured to update models. Although FIGS. 3-5 describe updating sound event classification models as a particular example, the described techniques are generally applicable to updating any type of model that may be used by the device 100.

FIG. 3 is a block diagram of an example of components of the device 100 configured to generate sound identification data responsive to audio data samples 310 and configured to update a sound event classification model. The device 100 of FIG. 3 includes one or more microphones 304 (e.g., the microphone(s) 104) configured to generate audio signals 306 (e.g., the audio data 105) based on sound 302 detected within an acoustic environment. The microphone(s) 304 are coupled to a feature extractor 308 that generates audio data samples 310 based on the audio signals 306. For example, the audio data samples 310 may include an array or matrix of data elements, with each data element corresponding to a feature detected in the audio signals 306. As a specific example, the audio data samples 310 can correspond to Mel spectrum features extracted from one second of the audio signals 306. In this example, the audio data samples 310 can include a 128×128 element matrix of feature values. In other examples, other audio data sample configurations or sizes can be used.

The audio data samples 310 are provided to a sound event classification (SEC) engine 320 (e.g., the model-based application 192). The SEC engine 320 is configured to perform inference operations based on one or more SEC models, such as an SEC model 312. "Inference operations" refer to assigning the audio data samples 310 to a sound class, if the sound class of the audio data samples 310 is recognized by the SEC model 312. For example, the SEC engine 320 may include or correspond to software that implements a machine-learning runtime environment, such as the Qualcomm Neural Processing SDK, which is available from Qualcomm Technologies, Inc. of San Diego, California, USA. In a particular aspect, the SEC model 312 is one of a plurality of SEC models (e.g., available SEC models 314) that are available to the SEC engine 320.

In a particular example, each of the available SEC models 314 (e.g., stored at the memory 108 or at the model library 162) includes or corresponds to a neural network that is trained as a sound event classifier. To illustrate, the SEC model 312 (as well as each of the other available SEC models 314) may include an input layer, one or more hidden layers, and an output layer. In this example, the input layer is configured to correspond to the array or matrix of values of the audio data samples 310 generated by the feature extractor 308. To illustrate, if the audio data samples 310 include 15 data elements, the input layer may include 15 nodes (e.g., one per data element). The output layer is configured to correspond to the sound classes that the SEC model 312 is trained to recognize. The specific arrangement of the output layer can vary depending on information to be provided as output. As one example, the SEC model 312 may be trained to output an array that includes one bit per sound class, where the output layer performs "one hot encoding" such that all but one of the bits of the output array have a value of zero, and the bit corresponding to a detected sound class has a value of one. Other output schemes can be used to indicate, for example, a value of a confidence metric for each sound class, where the value of the confidence metric indicates a probability estimate that the audio data samples 310 correspond to the respective sound class. To illustrate, if the SEC model 312 is trained to recognize four sound classes, the SEC model 312 may generate output data that includes four values (one per sound class), and each value may indicate a probability estimate that the audio data samples 310 correspond to the respective sound class.

Each of the hidden layers includes a plurality of nodes, and each node is interconnected (via a link) with other nodes in the same layer or in a different layer. Each input link of a node is associated with a link weight. During operation, a node receives input values from other nodes that it is linked to, weights the input values based on corresponding link weights to determine a combined value, and subjects the combined value to an activation function to generate an output value of the node. The output value is provided to one or more other nodes via output links of the node. The nodes may also include bias values that are used to generate the combined value. The nodes can be linked in various arrangements and can include various other features (e.g., memory of prior values) to facilitate processing of particular data. In the case of audio data samples, convolutional neural networks (CNNs) may be used. To illustrate, one or more of the SEC models 312 may include three linked CNNs, and each CNN may include a two-dimensional (2D) convolution layer, a maxpooling layer, and a batch normalization layer. In other implementations, the hidden layers include a different number of CNNs or other layers. Training the neural network includes modifying the link weights to reduce an output error of the neural network.

During operation, the SEC engine 320 may provide the audio data samples 310 as input to a single SEC model (e.g., the SEC model 312), to multiple selected SEC models (e.g., the SEC model 312 and a Kth SEC model 318 of the available SEC models 314), or to each of the SEC models (e.g., to the SEC model 312, a first SEC model 316, the Kth SEC model 318, and any other SEC models of the available SEC models 314). For example, the SEC engine 320 (or another component of the device 100) may select the SEC model 312 from among the available SEC models 314 based on, for example, user input, device settings associated with the device 100, sensor data, a time when the audio data samples 310 are received, or other factors. In this example, the SEC engine 320 may select to use only the SEC model 312 or may select to use two or more of the available SEC models 314. To illustrate, the device settings may indicate that the SEC model 312 and the first SEC model 316 are to be used during a particular time frame. In another example, the SEC engine 320 may provide the audio data samples 310 to each of the available SEC models 314 (e.g., sequentially or in parallel) to generate output from each. In a particular aspect, the SEC models are trained to recognize different sound classes, to recognize the same sound classes in different acoustic environments, or both. For example, the SEC model 312 may be configured to recognize a first set of sound classes and the first SEC model 316 may be configured to recognize a second set of sound classes, where the first set of sound classes is different from the second set of sound classes.

In a particular aspect, the SEC engine 320 determines, based on output of the SEC model 312, whether the SEC model 312 recognized the sound class of the audio data samples 310. If the SEC engine 320 provides the audio data samples 310 to multiple SEC models, the SEC engine 320 may determine, based on output of each of the SEC models, whether any of the SEC models recognized the sound class of the audio data samples 310. If the SEC model 312 (or another of the available SEC models 314) recognized the sound class of the audio data samples 310, the SEC engine 320 generates an output 324 that indicates the sound class 322 of the audio data samples 310. For example, the output 324 may be sent to a display to notify a user of detection of the sound class 322 associated with the sound 302 or may be sent to another device or another component of the device 100 and used to trigger an action (e.g., to send a command to activate lights in response to recognizing the sound of a door shutting).

If the SEC engine 320 determines that the SEC model 312 (and others of the available SEC models 314 that were provided the audio data samples 310) did not recognize the sound class of the audio data samples 310, the SEC engine 320 provides a trigger signal 326 to a drift detector 328. For example, the SEC engine 320 may set a trigger flag in a memory of the device 100. In some implementations, the SEC engine 320 may also provide other data to the drift detector 328. To illustrate, if the SEC model 312 generates a value of a confidence metric for each sound class that the SEC model 312 is trained to recognize, one or more of the values of the confidence metric may be provided to the drift detector 328. For example, if the SEC model 312 is trained to recognize three sound classes, the SEC engine 320 may provide a highest confidence value among three confidence values (one for each of the three sound classes) output by the SEC model 312 to the drift detector 328.

In a particular aspect, the SEC engine 320 determines whether the SEC model 312 recognized the sound class of the audio data samples 310 based on a value of a confidence metric. In this particular aspect, a value of the confidence metric for a particular sound class indicates the probability that the audio data samples 310 are associated with the particular sound class. To illustrate, if the SEC model 312 is trained to recognize four sound classes, the SEC model 312 may generate as output an array that includes four values of the confidence metric, one for each sound class. In some implementations, the SEC engine 320 determines that the SEC model 312 recognized the sound class 322 of the audio data samples 310 if the value of the confidence metric for the sound class 322 is greater than a detection threshold. For example, the SEC engine 320 determines that the SEC model 312 recognized the sound class 322 of the audio data samples 310 if the value of the confidence metric for the sound class 322 is greater than 0.90 (e.g., 90% confidence), 0.95 (e.g., 95% confidence), or some other value of the detection threshold. In some implementations, the SEC engine 320 determines that the SEC model 312 did not recognize a sound class of the audio data samples 310 if the value of the confidence metric for each sound class that the SEC model 312 is trained to recognize is less than the detection threshold. For example, the SEC engine 320 determines that the SEC model 312 did not recognize the sound class 322 of the audio data samples 310 if each value of the confidence metric is less than 0.90 (e.g., 90% confidence), 0.95 (e.g., 95% confidence), or some other value of the detection threshold.

The drift detector 328 is configured to determine whether the SEC model 312 that was not able to recognize the sound class of the audio data samples 310 corresponds to an audio scene 342 associated with the audio data samples 310. In the example illustrated in FIG. 1, a scene detector 340 (e.g., the context detector 140) is configured to receive scene data 338 (e.g., including a portion of the sensor data 138) and to use the scene data 338 to determine the audio scene 342 (e.g., the context 142) associated with the audio data samples 310. In a particular aspect, the scene data 338 is generated based on settings data 330 indicating one or more device settings associated with the device 100, output of a clock 332, sensor data from one or more sensors 334 (e.g., the sensors 134), input received via an input device 336, or a combination thereof. In some aspects, the scene detector 340 uses different information to determine the audio scene 342 than the SEC engine 320 uses to select the SEC model 312. To illustrate, if the SEC engine 320 selects the SEC model 312 based on time of day, the scene detector 340 may use position sensor data from a position sensor of the sensor(s) 334 to determine the audio scene 342. In some aspects, the scene detector 340 uses at least some of the same information that the SEC engine 320 uses to select the SEC model 312 and uses additional information. To illustrate, if the SEC engine 320 selects the SEC model 312 based on time of day and the settings data 330, the scene detector 340 may use the position sensor data and the settings data 330 to determine the audio scene 342. Thus, the scene detector 340 uses a different audio scene detection mode than is used by the SEC engine 320 to select the SEC model 312.

In a particular implementation, the scene detector 340 is a neural network that is trained to determine the audio scene 342 based on the scene data 338. In other implementations, the scene detector 340 is a classifier that trained using a different machine-learning technique. For example, the scene detector 340 may include or correspond to a decision tree, a random forest, a support vector machine, or another classifier that is trained to generate output indicating the audio scene 342 based on the scene data 338. In still other implementations, the scene detector 340 uses heuristics to determine the audio scene 342 based on the scene data 338. In yet other implementations, the scene detector 340 uses a combination of artificial intelligence and heuristics to determine the audio scene 342 based on the scene data 338. For example, the scene data 338 may include image data, video data, or both, and the scene detector 340 may include an image recognition model that is trained using a machine-learning technique to detect particular objects, motions, backgrounds, or other image or video information. In this example, output of the image recognition model may be evaluated via one or more heuristics to determine the audio scene 342.

The drift detector 328 compares the audio scene 342 indicated by the scene detector 340 to information descriptive of the SEC model 312 to determine whether the SEC model 312 is associated with the audio scene 342 of the audio data samples 310. If the drift detector 328 determines that the SEC model 312 is associated with the audio scene 342 of the audio data samples 310, the drift detector 328 causes drift data 344 to be stored as model update data 348. In a particular implementation, the drift data 344 includes the audio data samples 310 and a label, where the label identifies the SEC model 312, indicates a sound class associated with the audio data samples 310, or both. If the drift data 344 indicates a sound class associated with the audio data samples 310, the sound class may be selected based on a highest value of the confidence metric generated by the SEC model 312. As an illustrative example, if the SEC engine 320 uses a detection threshold of 0.90, and the highest value of the confidence metric output by the SEC model 312 is 0.85 for a particular sound class, the SEC engine 320 determines that the sound class of the audio data samples 310 was not recognized and sends the trigger signal 326 to the drift detector 328. In this example, if the drift detector 328 determines that the SEC model 312 corresponds to the audio scene 342 of the audio data samples 310, the drift detector 328 stores that the audio data samples 310 as drift data 344 associated with the particular sound class. In a particular aspect, metadata associated with the SEC models 314 includes information specifying an audio scene or audio scenes associated with each SEC model 314. For example, the SEC model 312 may be configured to detect sound events in a user's home, in which case the metadata associated with the SEC model 312 may indicate that the SEC model 312 is associate with a "home" audio scene. In this example, if the audio scene 342 indicates that the device 100 is at a home location (e.g., based on position information, user input, detection of a home wireless network signal, image or video data representing home locations, etc.), the drift detector 328 determines that the SEC model 312 corresponds to the audio scene 342.

In some implementations, the drift detector 328 also causes some audio data samples 310 to be stored as model update data 348 and designated as unknown data 346. As a first example, the drift detector 328 may store the unknown data 346 if the drift detector 328 determines that the SEC model 312 does not correspond to the audio scene 342 of the audio data samples 310. As a second example, the drift detector 328 may store the unknown data 346 if the value of the confidence metric output by the SEC model 312 fails to satisfy a drift threshold. In this example, the drift threshold is less than the detection threshold used by the SEC engine 320. For example, if the SEC engine 320 uses a detection threshold of 0.95, the drift threshold may have a value of 0.80, of 0.75, or some other value less than 0.95. In this example, if the highest value of the confidence metric for the audio data samples 310 is less than the drift threshold, the drift detector 328 determines that the audio data samples 310 belong to a sound class that the SEC model 312 is not trained to recognize, and designates the audio data samples 310 as unknown data 346. In a particular aspect, the drift detector 328 only stores the unknown data 346 if the drift detector 328 determines that the SEC model 312 corresponds to the audio scene 342 of the audio data samples 310. In another particular aspect, the drift detector 328 stores the unknown data 346 independently of whether the drift detector 328 determines that the SEC model 312 corresponds to the audio scene 342 of the audio data samples 310.

After the model update data 348 is stored, a model updater 352 can access the model update data 348 and use the model update data 348 to update one of the available SEC models 314 (e.g., the SEC model 312). For example, each entry of the model update data 348 indicates an SEC model with which the entry is associated, and the model updater 352 uses the entry as training data to update the corresponding SEC model. In a particular aspect, the model updater 352 updates an SEC model when an update criterion is satisfied or when a model update is initiated by a user or another party (e.g., a vendor of the device 100, the SEC engine 320, the SEC models 314, etc.). The update criterion may be satisfied when a particular number of entries are available in the model update data 348, when a particular number of entries for a particular SEC model are available in the model update data 348, when a particular number of entries for a particular sound class are available in the model update data 348, when a particular amount of time has passed since a prior update, when other updates occur (e.g., when a software update associated with the device 100 occurs), or based on occurrence of another event.

The model updater 352 uses the drift data 344 as labeled training data to update training of the SEC model 312 using backpropagation or a similar machine-learning optimization process. For example, the model updater 352 provides audio data samples from the drift data 344 of the model update data 348 as input to the SEC model 312, determines a value of an error function (also referred to as a loss function) based on output of the SEC model 312 and a label associate with the audio data samples (as indicated in the drift data 344 stored by the drift detector 328), and determines updated link weights for the SEC model 312 using a gradient descent operation (or some variant thereof) or another machine-learning optimization process.

The model updater 352 may also provide other audio data samples (in addition to audio data samples of the drift data 344) to the SEC model 312 during the update training. For example, the model update data 348 may include one or more known audio data samples (such as a subset of the audio data samples originally used to train the SEC model 312), which may reduce the chances of the update training causing the SEC model 312 to forget previous training (where "forgetting" here refers to losing reliability for detecting sound classes that the SEC model 312 was previously trained to recognize). Since the sound class associated with the audio data samples of the drift data 344 is indicated by the drift detector 328, update training to account for drift can be accomplished automatically (e.g., without user input). As a result, functionality of the device 100 (e.g., accuracy in recognizing sound classes) can improve over time without user intervention and using fewer computing resources than would be used to generate a new SEC model from scratch. A particular example of a transfer learning process that the model updater 352 can use to update the SEC model 312 based on the drift data 344 is described with reference to FIG. 4.

In some aspects, the model updater 352 can also use the unknown data 346 of the model update data 348 to update training of the SEC model 312. For example, periodically or occasionally, such as when the update criterion is satisfied, the model updater 352 may prompt a user to ask the user to label the sound class of the entries of the unknown data 346 in the model update data 348. If the user choses to label the sound class of an entry of unknown data 346, the device 100 (or another device) may playout sound corresponding to audio data samples of the unknown data 346. The user can provide one or more labels 350 (e.g., via the input device 336) identifying a sound class of the audio data samples. If the sound class indicated by the user is a sound class that the SEC model 312 is trained to recognize, then the unknown data 346 is reclassified as drift data 344 associated with the user-specified sound class and the SEC model 312. Depending on the configuration of the model updater 352, if the sound class indicated by the user is a sound class that the SEC model 312 is not trained to recognize (e.g., is a new sound class), the model updater 352 may discard the unknown data 346, send the unknown data 346 and the user-specified sound class to another device for use to generate a new or updated SEC model, or may use the unknown data 346 and the user-specified sound class to update the SEC model 312. A particular example of a transfer learning process that the model updater 352 can use to update the SEC model 312 based on the unknown data 346 and the user-specified sound class is described with reference to FIG. 5.

An updated SEC model 354 generated by the model updater 352 is added to the available SEC models 314 to make the updated SEC model 354 available to evaluate audio data samples 310 received after the updated SEC model 354 is generated. Thus, the set of available SEC models 314 that can be used to evaluate sounds is dynamic. For example, one or more of the available SEC models 314 can be automatically updated to account for drift data 344. Additionally, one or more of the available SEC models 314 can be updated to account for unknown sound classes using transfer learning operations that use fewer computing resources (e.g., memory, processing time, and power) than training a new SEC model from scratch.

FIG. 4 is a diagram that illustrates aspects of updating an SEC model 408 to account for drift according to a particular example. The SEC model 408 of FIG. 4 includes or corresponds to a particular one of the available SEC models 314 of FIG. 3 that is associated with the drift data 344. For example, if the SEC engine 320 generated the trigger signal 326 in response to output of the SEC model 312, the drift data 344 is associated with the SEC model 312, and the SEC model 408 corresponds to or includes the SEC model 312. As another example, if the SEC engine 320 generated the trigger signal 326 in response to output of the Kth SEC model 318, the drift data 344 is associated with the Kth SEC model 318, and the SEC model 408 corresponds to or includes the Kth SEC model 318.

In the example illustrated in FIG. 4, training data 402 is used to update the SEC model 408. The training data 402 includes the drift data 344 and one or more labels 404. Each entry of the drift data 344 includes audio data samples (e.g., audio data samples 406) and is associated with a corresponding label of the label(s) 404. The audio data samples of an entry of the drift data 344 include a set of values representing features extracted from or determined based on a sound that was not recognized by the SEC model 408. The label 404 corresponding to an entry of the drift data 344 identifies a sound class to which the sound is expected to belong. As an example, the label 404 corresponding to an entry of the drift data 344 may be assigned by the drift detector 328 of FIG. 3 in response to determining that the SEC model 408 corresponds to the audio scene in which the audio data samples were generated. In this example, the drift detector 328 may assign the audio data samples to the sound class that was associated, in the output of the SEC model 408, with a highest confidence metric value.

In FIG. 4, audio data samples 406 corresponding to a sound are provided to the SEC model 408, and the SEC model 408 generates output 410 that indicates a sound class to which the audio data samples 406 are assigned, one or more values of a confidence metric, or both. The model updater 352 uses the output 410 and the label 404 corresponding to the audio data samples 406 to determine updated link weights 412 for the SEC model 408. The SEC model 408 is updated based on the updated link weights 412, and the training process is repeated iteratively until a training termination condition is satisfied. During training, each of the entries of the drift data 344 may be provided to the SEC model 408 (e.g., one entry per iteration). Additionally, in some implementations, other audio data samples (e.g., audio data samples previously used to train the SEC model 408) may also be provided to the SEC model 408 to reduce the chance of the SEC model 408 forgetting prior training.

The training termination condition may be satisfied when all of the drift data 344 has been provided to the SEC model 408 at least once, after a particular number of training iterations have been performed, when a convergence metric satisfies a convergence threshold, or when some other condition indicative of the end of training is met. When the training termination condition is satisfied, the model updater 352 stores the updated SEC model 414, where the updated SEC model 414 corresponds to the SEC model 408 with link weights based on the updated link weights 412 applied during training.

FIG. 5 is a diagram that illustrates aspects of updating an SEC model 510 based on training data 502 to account for unknown data according to a particular example. The SEC model 510 of FIG. 5 includes or corresponds to a particular one of the available SEC models 314 of FIG. 3 that is associated with the unknown data 346. For example, if the SEC engine 320 generated the trigger signal 326 in response to output of the SEC model 312, the unknown data 346 is associated with the SEC model 312, and the SEC model 510 corresponds to or includes the SEC model 312. As another example, if the SEC engine 320 generated the trigger signal 326 in response to output of the Kth SEC model 318, the unknown data 346 is associated with the Kth SEC model 318, and the SEC model 510 corresponds to or includes the Kth SEC model 318.

In the example of FIG. 5, the model updater 352 generates an update model 506. The update model 506 includes the SEC model 510 that is to be updated, an incremental model 508, and one or more adapter networks 512. The incremental model 508 is a copy of the SEC model 510 with a different output layer than the SEC model 510. In particular, the output layer of the incremental model 508 includes more output nodes than the output layer of the SEC model 510. For example, the output layer of the SEC model 510 includes a first count of nodes (e.g., N nodes, where N is a positive integer corresponding to the number of sound classes that the SEC model 510 is trained to recognize), and the output layer of the incremental model 508 includes a second count of nodes (e.g., N+M nodes, where M is a positive integer corresponding to a number of new sound classes that an updated SEC model 524 is to be trained to recognized that the SEC model 510 is not trained to recognize). The first count of nodes corresponds to the count of sound classes of a first set of sound classes that the SEC model 510 is trained to recognize (e.g., the first set of sound classes includes N distinct sound classes that the SEC model 510 can recognize), and the second count of nodes corresponds to the count of sound classes of a second set of sound classes that the updated SEC model 524 is to be trained to recognize (e.g., the second set of sound classes includes N+M distinct sound classes that the updated SEC model 524 is to be trained to recognize). The second set of sound classes includes the first set of sound classes (e.g., N classes) plus one or more additional sound classes (e.g., M classes). Model parameters (e.g., link weights) of the incremental model 508 are initialized to be equal to model parameters of the SEC model 510.

The adapter network(s) 512 include a neural adapter and a merger adapter. The neural adapter includes one or more adapter layers configured to receive input from the SEC model 510 and to generate output that can be merged with the output of the incremental model 508. For example, the SEC model 510 generates a first output corresponding to the first count of classes of the first set of sound classes. In a particular aspect, the first output includes one data element for each node of the output layer of the SEC model 510 (e.g., N data elements). In contrast, the incremental model 508 generates a second output corresponding to the second count of classes of the second set of sound classes. For example, the second output includes one data element for each node of the output layer of the incremental model 508 (e.g., N+M data elements). In this example, the adapter layer(s) of the adapter network(s) 512 receive the output of the SEC model 510 as input and generate an output having the second count of data elements (e.g., N+M). In a particular example, the adapter layer(s) of the adapter network(s) 512 include two fully connected layers (e.g., an input layer including N nodes and an output layer including N+M nodes, with each node of the input layer connected to every node of the output layer).

The merger adapter of the adapter network(s) 512 is configured to generate output 514 of the update model 506 by merging the output of the adapter layer(s) and the output of the incremental model 508. For example, the merger adapter combines the output of the adapter layer(s) and the output of the incremental model 508 in an element-by-element manner to generate a combined output and applies an activation function (such as a sigmoid function) to the combined output to generate the output 514. The output 514 indicates a sound class to which the audio data samples 504 are assigned by the update model 506, one or more confidence metric values determined by the update model 506, or both.

The model updater 352 uses the output 514 and a label 350 corresponding to the audio data samples 504 to determine updated link weights 516 for the incremental model 508, the adapter network(s) 512, or both. Link weights of the SEC model 510 are unchanged during training. The training process is repeated iteratively until a training termination condition is satisfied. During training, each of the entries of the unknown data 346 may be provided to the update model 506 (e.g., one entry per iteration). Additionally, in some implementations, other audio data samples (e.g., audio data samples previously used to train the SEC model 510) may also be provided to the update model 506 to reduce the chance of the incremental model 508 forgetting prior training of the SEC model 510.

The training termination condition may be satisfied when all of the unknown data 346 has been provided to the update model 506 at least once, after a particular number of training iterations have been performed, when a convergence metric satisfies a convergence threshold, or when some other condition indicative of the end of training is met. When the training termination condition is satisfied, a model checker 520 selects the updated SEC model 524 from between the incremental model 508 and the update model 506 (e.g., the combination of the SEC model 510, the incremental model 508, and the adapter network(s) 512).

In a particular aspect, the model checker 520 selects the updated SEC model 524 based on an accuracy of sound classes 522 assigned by the incremental model 508 and an accuracy of the sound classes 522 assigned by the SEC model 510. For example, the model checker 520 may determine an F1-score for the incremental model 508 (based on the sound classes 522 assigned by the incremental model 508) and an F1-score of the SEC model 510 (based on the sound classes 522 assigned by the SEC model 510). In this example, if the value of the F1-score of incremental model 508 is greater than or equal to the value of the F1-score of the SEC model 510, the model checker 520 selects the incremental model 508 as the updated SEC model 524. In some implementations, the model checker 520 selects the incremental model 508 as the updated SEC model 524 if the value of the F1-score of the incremental model 508 is greater than or equal to the value of the F1-score of the SEC model 510 (or is less than the value of the F1-score of the SEC model 510 by less than a threshold amount). If the value of the F1-score of incremental model 508 is less than the value of the F1-score for the SEC model 510 (or is less than the value of the F1-score for the SEC model 510 by more than the threshold amount), the model checker 520 selects the update model 506 as the updated SEC model 524. If the incremental model 508 is selected as the updated SEC model 524, the SEC model 510, the adapter network(s) 512, or both may be discarded.

In some implementations, the model checker 520 is omitted or integrated with the model updater 352. For example, after training the update model 506, the update model 506 can be stored as the updated SEC model 524 (e.g., with no selection between the update model 506 and the incremental model 508). As example, while training the update model 506, the model updater 352 can determine an accuracy metric for the incremental model 508. In this example, the training termination condition may be based on the accuracy metric for the incremental model 508 such that after training, the incremental model 508 is stored as the updated SEC model 524 (e.g., with no selection between the update model 506 and the incremental model 508).

Utilizing the transfer learning techniques described with reference to FIG. 5, the model checker 520 enables the device 100 of FIG. 3 to update an SEC model to recognize a previously unknown sound class. Additionally, the transfer learning techniques described use significantly less computer resources (e.g., memory, processing time, and power) than would be used to train an SEC model from scratch to recognize the previously unknown sound class.

In some implementations, the operations described with reference to FIG. 4 (e.g., generating the updated SEC model 414 based on the drift data 344) are performed at the device 100 of FIG. 3 (e.g., at the one or more processors 110), and the operations described with reference to FIG. 5 (e.g., generating the updated SEC model 524 based on the unknown data 346) are performed at different device (such as a remote computing device 818 of FIG. 8). To illustrate, the unknown data 346 and label(s) 350 can be captured at the device 100 and transmitted to a second device that has more available computing resources. In this example, the second device generates the updated SEC model 524 and the device 100 downloads or receives a transmission or data representing the updated SEC model 524 from the second device. Generating the updated SEC model 524 based on the unknown data 346 is a more resource intensive process (e.g., uses more memory, power, and processor time) than generating the updated SEC model 414 based on the drift data 344. Thus, dividing operations described with reference to FIG. 4 and the operations described with reference to FIG. 5 among different devices can conserve resources of the device 100.

Figure 6:
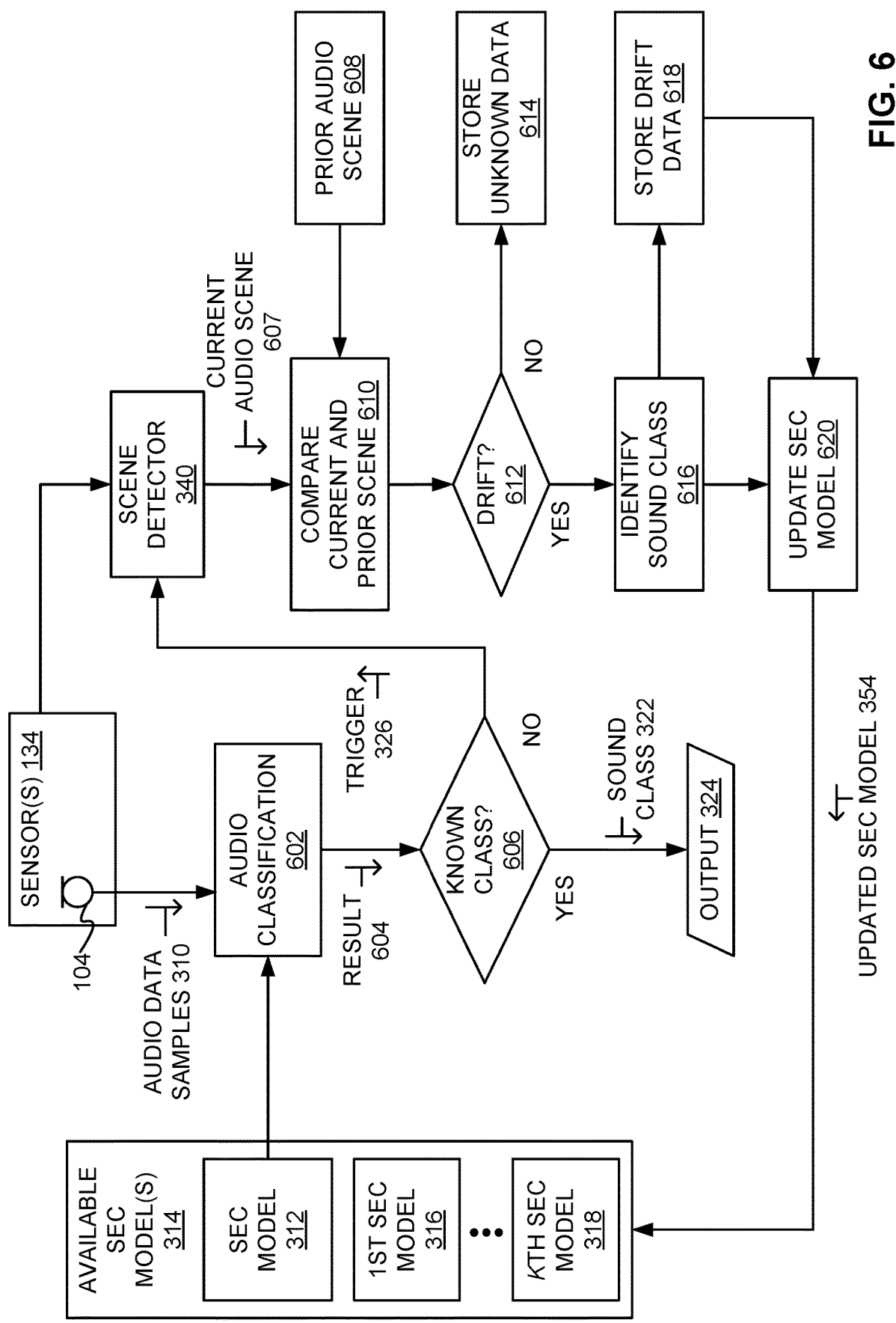
FIG. 6 is a diagram illustrating a particular example of updating a model that may be performed by the device of FIG. 1, in accordance with some examples of the present disclosure.

FIG. 6 is a diagram illustrating a particular example of operation of the device 100 of FIG. 1 in which a determination of whether an active SEC model (e.g., the SEC model 312) corresponds to an audio scene in which audio data samples 310 are captured is based on comparing a current audio scene to a prior audio scene.

In FIG. 6, audio data captured by the microphone(s) 104 is used to generate the audio data samples 310. The audio data samples 310 are used to perform audio classification 602. For example, one or more of the available SEC models 314 is used as an active SEC model by the SEC engine 320 of FIG. 3. In a particular aspect, the active SEC model is selected from among the available SEC models 314 based on an audio scene indicated by the scene detector 340 during a prior sampling period, which is also referred to as a prior audio scene 608.

Audio classification 602 generates a result 604 based on analysis of the audio data samples 310 using the active SEC model. The result 604 may indicate a sound class associated with the audio data samples 310, a probability that the audio data samples 310 correspond to a particular sound class, or that a sound class of the audio data samples 310 is unknown. If the result 604 indicates that the audio data samples 310 correspond to a known sound class, a decision is made, at block 606, to generate an output 324 indicating the sound class 322 associated with the audio data samples 310. For example, the SEC engine 320 of FIG. 1 may generate the output 324.

If the result 604 indicates that the audio data samples 310 do not correspond to a known sound class, a decision is made, at block 606, to generate the trigger 326. The trigger 326 activates a drift detection scheme, which in FIG. 6 includes causing the scene detector 340 to identify the current audio scene 607 based on data from the sensor(s) 134.

The current audio scene 607 is compared, at block 610, to the prior audio scene 608 to determine whether an audio scene change has occurred since the active SEC model was selected. At block 612, a determination is made whether the sound class of the audio data samples 310 was not recognized due to drift. For example, if the current audio scene 607 does not correspond to the prior audio scene 608, the determination at block 612 is that drift was not the cause of the sound class of the audio data samples 310 not being recognized. In this circumstance, the audio data samples 310 may be discarded or, at block 614, stored as unknown data.

If the current audio scene 607 corresponds to the prior audio scene 608, the determination at block 612 is that the sound class of the audio data samples 310 was not recognized due to drift because the active SEC model corresponds to the current audio scene 607. In this circumstance, the sound class that has drifted is identified, at block 616, and the audio data samples 310 and an identifier of the sound class are stored as drift data, at block 618.

When sufficient drift data is stored, the SEC model is updated, at block 620, to generate the updated SEC model 354. The updated SEC model 354 is added to the available SEC models 314. In some implementations, the updated SEC model 354 replaces the active SEC model that generated the result 604.

Figure 7:
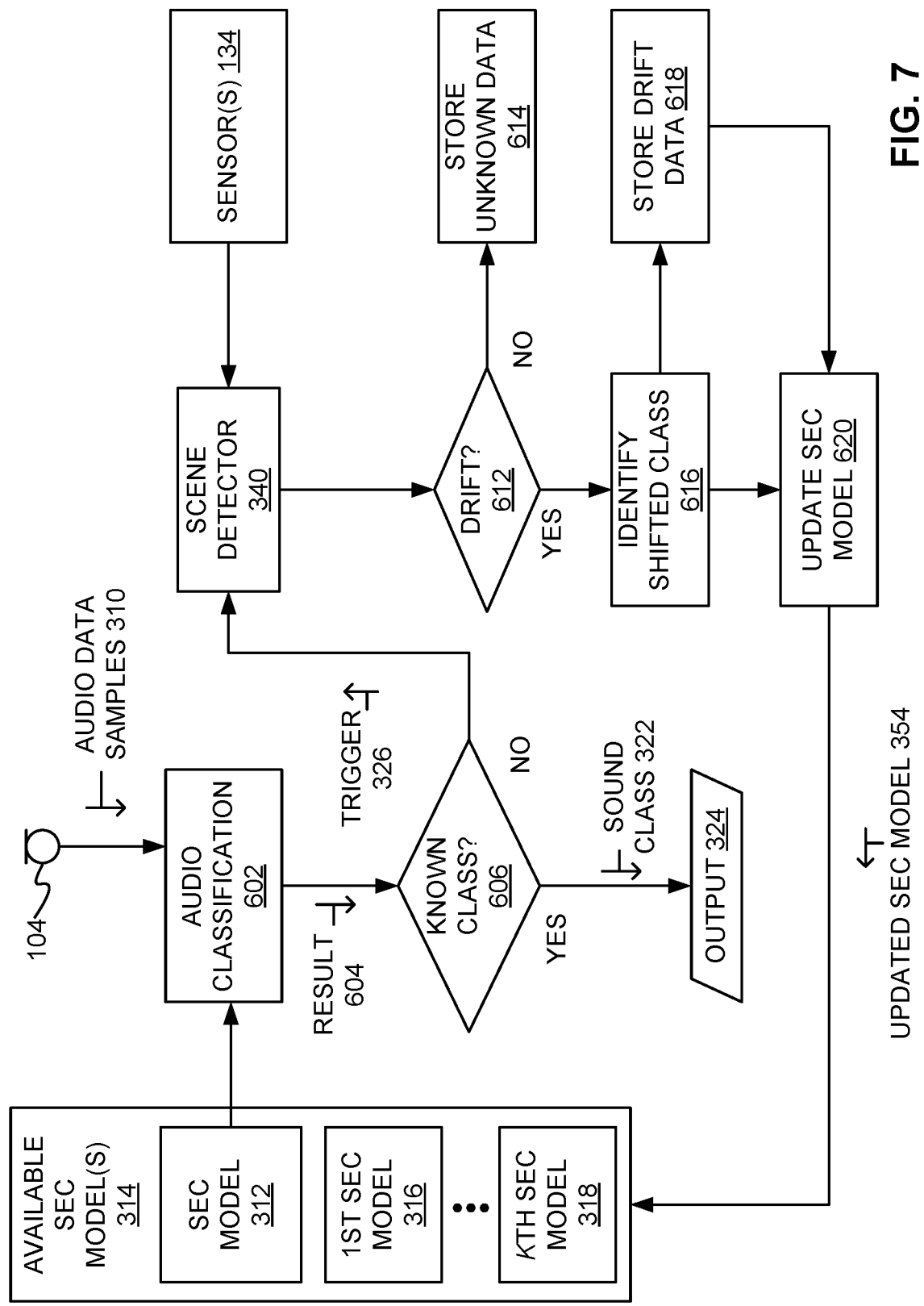
FIG. 7 is a diagram illustrating another particular example of updating a model that may be performed by the device of FIG. 1, in accordance with some examples of the present disclosure.

FIG. 7 is a diagram illustrating another particular example of operation of the device 100 of FIG. 1 in which a determination of whether an active SEC model (e.g., SEC model 312) corresponds to an audio scene in which audio data samples 310 are captured is based on comparing a current audio scene to information descriptive of the active SEC model.

In FIG. 7, audio data captured by the microphone(s) 104 is used to generate the audio data samples 310. The audio data samples 310 are used to perform audio classification 602. For example, one or more of the available SEC models 314 is used as an active SEC model by the SEC engine 320 of FIG. 3. In a particular aspect, the active SEC model is selected from among the available SEC models 314. In some implementations, an ensemble of the available SEC models 314 is used rather than selecting one or more of the available SEC models 314 as an active SEC model.

The audio classification 602 generates a result 604 based on analysis of the audio data samples 310 using one or more of the available SEC model 314. The result 604 may indicate a sound class associated with the audio data samples 310, a probability that the audio data samples 310 correspond to a particular sound class, or that a sound class of the audio data samples 310 is unknown. If the result 604 indicates that the audio data samples 310 correspond to a known sound class, a decision is made, at block 606, to generate an output 324 indicating the sound class 322 associated with the audio data samples 310. For example, the SEC engine 320 of FIG. 3 may generate the output 324.

If the result 604 indicates that the audio data samples 310 do not correspond to a known sound class, a decision is made, at block 606, to generate the trigger 326. The trigger 326 activates a drift detection scheme, which in FIG. 7 includes causing the scene detector 340 to identify the current audio scene based on data from the sensor(s) 134 and to determine whether the current audio scene corresponds to the SEC model that generated the result 604 that caused the trigger 326 to be sent.

At block 612, a determination is made whether the sound class of the audio data samples 310 was not recognized due to drift. For example, if the current audio scene does not correspond to the SEC model that generated the result 604, the determination at block 612 is that drift was not the cause of the sound class of the audio data samples 310 not being recognized. In this circumstance, the audio data samples 310 may be discarded or, at block 614, stored as unknown data.

If the current audio scene corresponds to the SEC model that generated the result 604, the determination at block 612 is that the sound class of the audio data samples 310 was not recognized due to drift. In this circumstance, the sound class that has drifted is identified, at block 616, and the audio data samples 310 and an identifier of the sound class are stored as drift data, at block 618.

When sufficient drift data is stored, the SEC model is updated, at block 620, to generate the updated SEC model 354. The updated SEC model 354 is added to the available SEC models 314. In some implementations, the updated SEC model 354 replaces the active SEC model that generated the result 604.

Operations to update models as described with reference to FIGS. 3-7 may be used in conjunction with context-based model selection as described with reference to FIGS. 1-2. For example, a first person and a second person that live together in a first residence (e.g., a rural house) may have devices that use common models associated with the first residence, and such models may be updated by training the models to accommodate new sound events and drift associated with the first residence. After the first person moves to a second residence (e.g., a college dormitory), the device of the first person may update one or more models for improved accuracy at the second residence, and therefore the models used by the devices of the first person and the second person may diverge significantly. Upon the first person returning to the first residence, the device of the first person may select and download models used by the device of the second person to achieve higher accuracy during use at the first residence. For example, the second person may provide access permissions to share one or more models with the first person's device, such as via peer-to-peer transfer between devices or via a local wireless home network. Upon exiting the first residence, the first person's device may remove the shared models associated with the first residence and revert to the models associated with the second residence.

Figure 8:
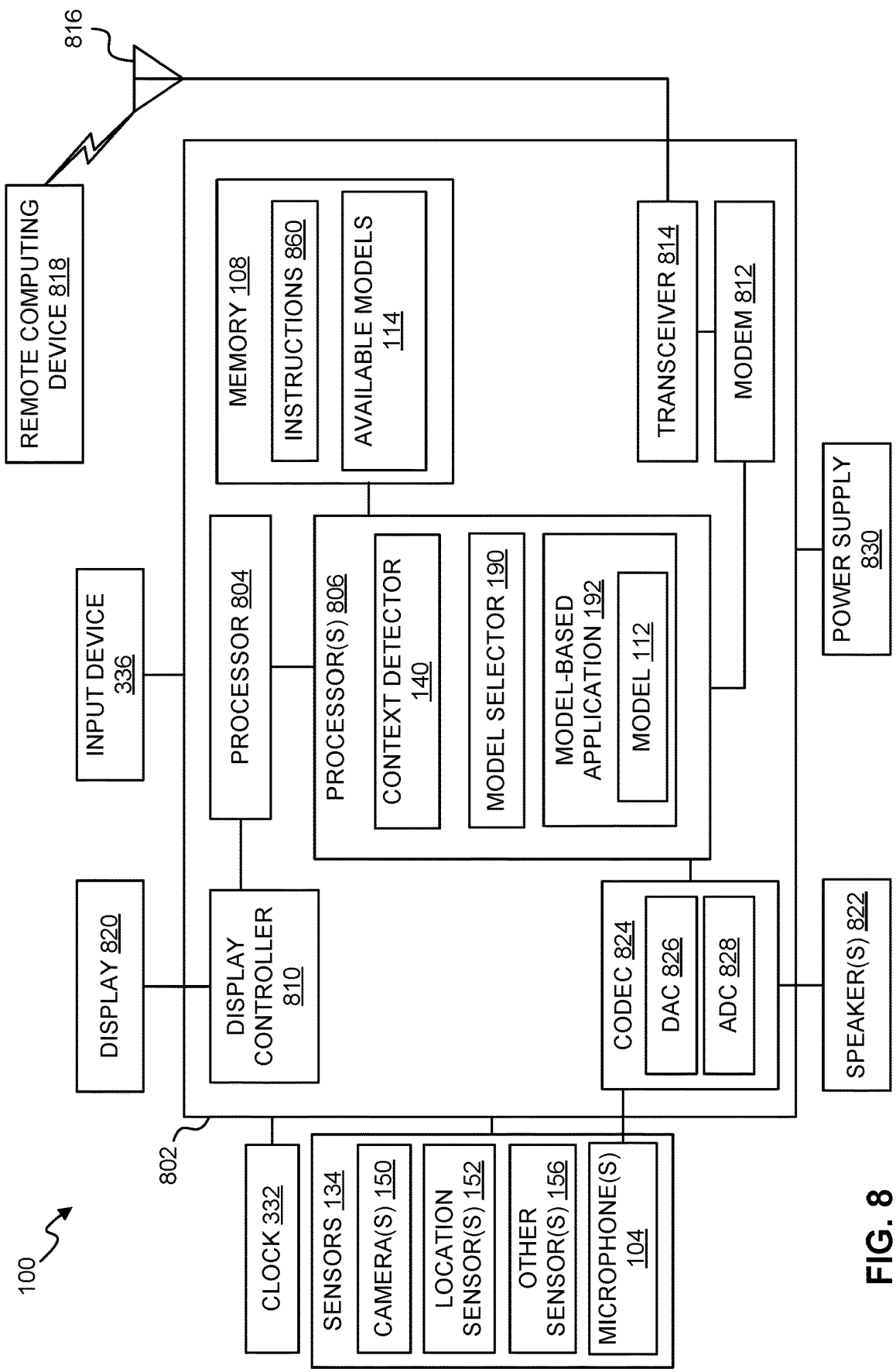
FIG. 8 is a block diagram illustrating a particular example of the device of FIG. 1, in accordance with some examples of the present disclosure.

FIG. 8 is a block diagram illustrating a particular example of the device 100 of FIG. 1. In various implementations, the device 100 may have more or fewer components than illustrated in FIG. 8.

In a particular implementation, the device 100 includes a processor 804 (e.g., a central processing unit (CPU)). The device 100 may include one or more additional processor(s) 806 (e.g., one or more digital signal processors (DSPs)). The processor 804, the processor(s) 806, or both, may correspond to the one or more processors 110. For example, in FIG. 8, the processor(s) 806 include the context detector 140, the model selector 190, and the model-based application 192.

In FIG. 8, the device 100 also includes the memory 108 and a CODEC 824. The memory 108 stores instructions 860 that are executable by the processor 804, or the processor(s) 806, to implement one or more operations described with reference to FIGS. 1-7. In an example, the memory 108 corresponds to a non-transitory computer-readable medium that stores the instructions 860 executable by the one or more processors 110, and the instructions 860 include or correspond to (e.g., are executable by a processor to perform operations attributed to) the context detector 140, the model selector 190, the model-based application 192, or a combination thereof. The memory 108 may also store the available models 114.

In FIG. 8, speaker(s) 822 and the microphone(s) 104 may be coupled to the CODEC 824. In the example illustrated in FIG. 8, the CODEC 824 includes a digital-to-analog converter (DAC 826) and an analog-to-digital converter (ADC 828). In a particular implementation, the CODEC 824 receives analog signals from the microphone(s) 104, converts the analog signals to digital signals using the ADC 828, and provides the digital signals to the processor(s) 806. In a particular implementation, the processor(s) 806 provide digital signals to the CODEC 824, and the CODEC 824 converts the digital signals to analog signals using the DAC 826 and provides the analog signals to the speaker(s) 822.

In FIG. 8, the device 100 also includes an input device 336. The device 100 may also include a display 820 coupled to a display controller 810. In a particular aspect, the input device 336 includes a sensor, a keyboard, a pointing device, etc. In some implementations, the input device 336 and the display 820 are combined in a touchscreen or similar touch or motion sensitive display.

In some implementations, the device 100 also includes a modem 812 coupled to a transceiver 814. In FIG. 8, the transceiver 814 is coupled to an antenna 816 to enable wireless communication with other devices, such as the remote computing device 818 (e.g., a server or network memory storing at least a portion of the model library 162). For example, the modem 812 may be configured to receive the model 112, an access permission for the model 112, or both, at least partially based on the location of the device 100 matching the particular location, from the remote computing device 818 via wireless transmission. In other examples, the transceiver 814 is also, or alternatively, coupled to a communication port (e.g., an ethernet port) to enable wired communication with other devices, such as the remote computing device 818.

In FIG. 8, the device 100 includes the clock 332 and the sensors 134. As specific examples, the sensors 134 include one or more cameras 150, one or more location sensors 152, the microphone(s) 104, the activity detector 154, other sensor(s) 156, or a combination thereof.

In a particular aspect, the clock 332 generates a clock signal that can be used to assign a timestamp to particular sensor data samples to indicate when particular sensor data samples were received. In this aspect, the model selector 190 can use the timestamp to select a model to use to process input data. Additionally or alternatively, the timestamp can be used by the context detector 140 to determine the context 142 associated with the particular sensor data samples.

In a particular aspect, the camera(s) 150 generate image data, video data, or both. The model selector 190 can use the image data, the video data, or both, to select a particular model to use to analyze input data. Additionally or alternatively, the image data, the video data, or both, can be used by the context detector 140 to determine the context 142 associated with the particular sensor data samples. For example, the particular model 112 can be designated for outdoor use, and the image data, the video data, or both, may be used to confirm that the device 100 is located in an outdoor environment.

In a particular aspect, the location sensor(s) 152 generate location data, such as global position data indicating a location of the device 100. The model selector 190 can use the location data to select a model to use to analyze input data. Additionally or alternatively, the position data can be used by the context detector 140 to determine the context 142 associated with the particular sensor data samples. For example, the particular model 112 can be designated for use at home, and the location data may be used to confirm that the device 100 is located at a home location. The location sensor(s) 852 may include a receiver for a satellite-based positioning system, a receiver for a local positioning system receiver, an inertial navigation system, a landmark-based positioning system, or a combination thereof.

The other sensor(s) 156 can include, for example, an orientation sensor, a magnetometer, a light sensor, a contact sensor, a temperature sensor, or any other sensor that is coupled to or included within the device 100 and that can be used to generate sensor data useful for determining the context 142 associated with the device 100 at a particular time.

In a particular implementation, the device 100 is included in a system-in-package or system-on-chip device 802. In a particular implementation, the memory 108, the processor 804, the processor(s) 806, the display controller 810, the CODEC 824, the modem 812, and the transceiver 814 are included in the system-in-package or system-on-chip device 802. In a particular implementation, the input device 336 and a power supply 830 are coupled to the system-on-chip device 802. Moreover, in a particular implementation, as illustrated in FIG. 8, the display 820, the input device 336, the speaker(s) 822, the sensors 134, the clock 332, the antenna 816, and the power supply 830 are external to the system-on-chip device 802. In a particular implementation, each of the display 820, the input device 336, the speaker(s) 822, the sensors 134, the clock 332, the antenna 816, and the power supply 830 may be coupled to a component of the system-on-chip device 802, such as an interface or a controller.

The device 100 may include, correspond to, or be included within a voice activated device, an audio device, a wireless speaker and voice activated device, a portable electronic device, a car, a vehicle, a computing device, a communication device, an internet-of-things (IoT) device, a virtual reality (VR) device, an augmented reality (AR) device, a mixed reality (MR) device, a smart speaker, a mobile computing device, a mobile communication device, a smart phone, a cellular phone, a laptop computer, a computer, a tablet, a personal digital assistant, a display device, a television, a gaming console, an appliance, a music player, a radio, a digital video player, a digital video disc (DVD) player, a tuner, a camera, a navigation device, or any combination thereof. In a particular aspect, the processor 804, the processor(s) 806, or a combination thereof, are included in an integrated circuit.

Figure 9:
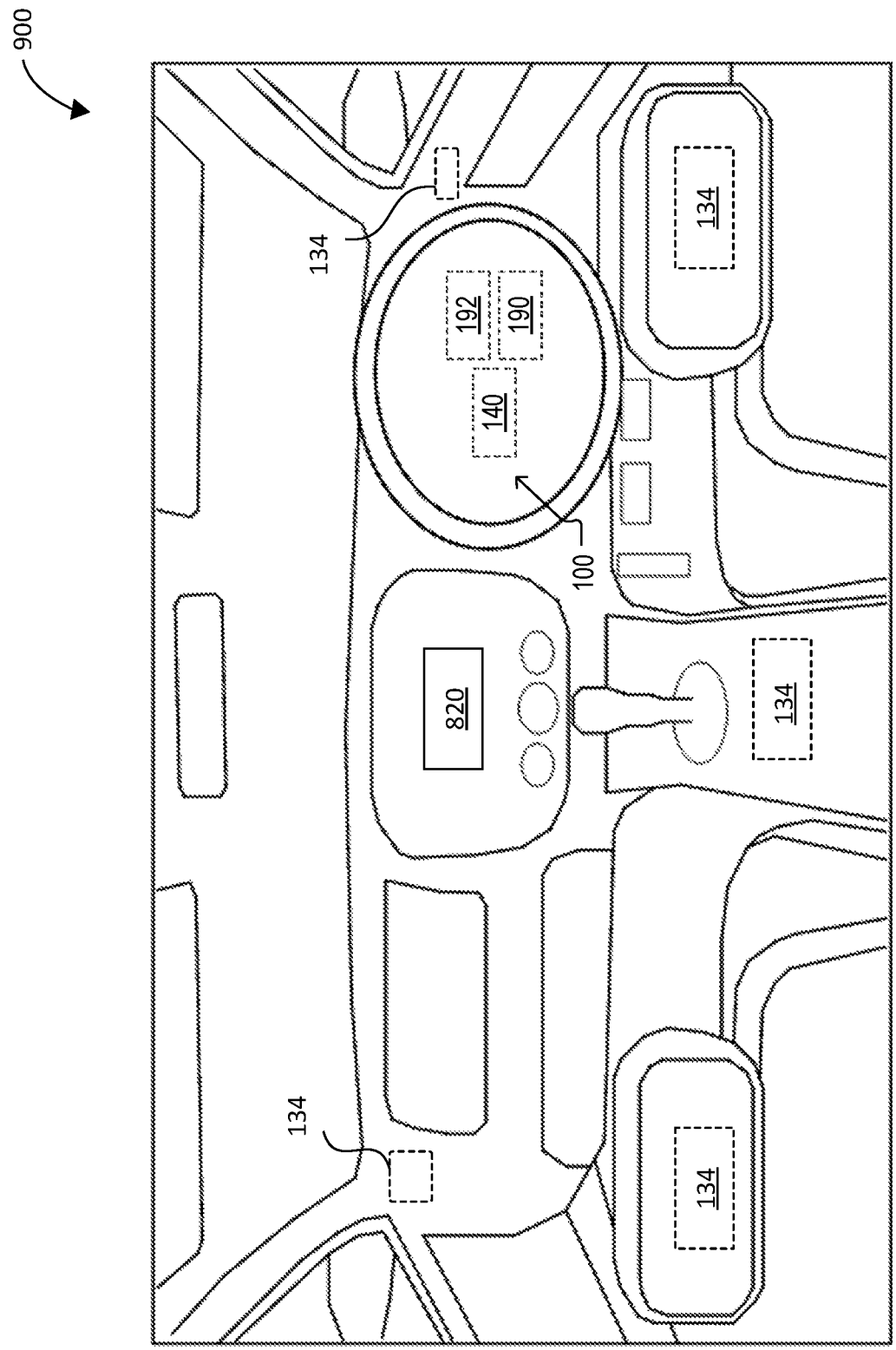
FIG. 9 is an illustrative example of a vehicle that incorporates aspects of the device of FIG. 1, in accordance with some examples of the present disclosure.

FIG. 9 is an illustrative example of a vehicle 900 that incorporates aspects of the device 100 of FIG. 1. According to one implementation, the vehicle 900 is a self-driving car. According to other implementations, the vehicle 900 is a car, a truck, a motorcycle, an aircraft, a water vehicle, etc. In FIG. 9, the vehicle 900 includes the display 820, one or more of the sensors 134, the device 100 including the context detector 140, the model selector 190, the model-based application 192, or a combination thereof. The sensors 134, the context detector 140, the model selector 190, and the model-based application 192 are shown using a dotted line to indicate that these components might not be visible to passengers of the vehicle 900. The device 100 can be integrated into the vehicle 900 or coupled to the vehicle 900.

In a particular aspect, the device 100 is coupled to the display 820 and provides an output to the display 820 responsive to the model-based application 192, such in response to detecting or recognizing various events (e.g., sound events) described herein. For example, the device 100 provides the output 324 of FIG. 3 to the display 820 indicating a sound class of a sound 302 (such as a car horn) in audio data 105 received from the microphone(s) 104. In some implementations, the device 100 can perform an action responsive to recognizing a sound event, such as alerting an operator of the vehicle or activating one of the sensors 134. In a particular example, the device 100 provides an output that indicates whether an action is being performed responsive to the recognized sound event. In a particular aspect, a user can select an option displayed on the display 820 to enable or disable a performance of actions responsive to recognized sound events.

In a particular implementations, the sensors 134 include the microphone(s) 104 of FIG. 1, vehicle occupancy sensors, eye tracking sensor, location sensor(s) 152, or external environment sensors (e.g., lidar sensors or cameras). In a particular aspect, sensor input of the sensors 134 indicates a location of the user. For example, the sensors 134 are associated with various locations within the vehicle 900.

Thus, the techniques described with respect to FIGS. 1-8 enable a user of the vehicle 900 to select a model to be used based on the specific context in which the device 100 operates.

Figure 10:
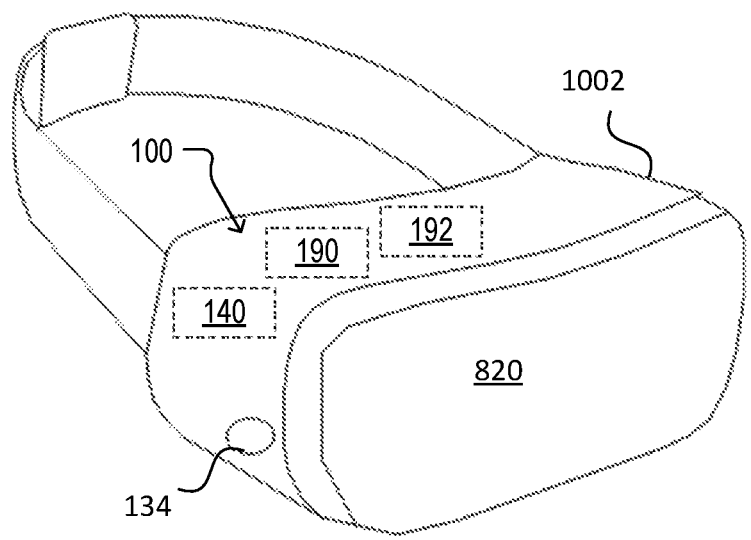
FIG. 10 illustrates virtual reality, mixed reality, or augmented reality headset that incorporates aspects of the device of FIG. 1, in accordance with some examples of the present disclosure.

FIG. 10 depicts an example of the device 100 coupled to or integrated within a headset 1002, such as a virtual reality headset, an augmented reality headset, a mixed reality headset, an extended reality headset, a head-mounted display, or a combination thereof. A visual interface device, such as the display 820, is positioned in front of the user's eyes to enable display of augmented reality, mixed reality, or virtual reality images or scenes to the user while the headset 1002 is worn. In a particular example, the display 820 is configured to display output of the device 100. The headset 1002 includes the sensors 134, such as the microphone(s) 104, the camera(s) 150, the location sensor(s) 152, the other sensors 156, or a combination thereof. Although illustrated in a single location, in other implementations the sensors 134 can be positioned at other locations of the headset 1002, such as an array of one or more microphones and one or more cameras distributed around the headset 1002 to detect multi-modal inputs.

The sensors 134 enable detection of sensor data, which the device 100 uses to detect a context of the headset 1002 and to update models based on the detected context. For example, the model-based application 192 (e.g., the SEC engine 320) may use one or more models to generate the sound event classification data which may be provided to the display 820 to indicate that a recognized sound event, such as a car horn, is detected in audio data samples received from the sensors 134. In some implementations, the device 100 can perform an action responsive to recognizing a sound event, such as activating a camera or another one of the sensors 134 or providing haptic feedback to the user.

Figure 11:
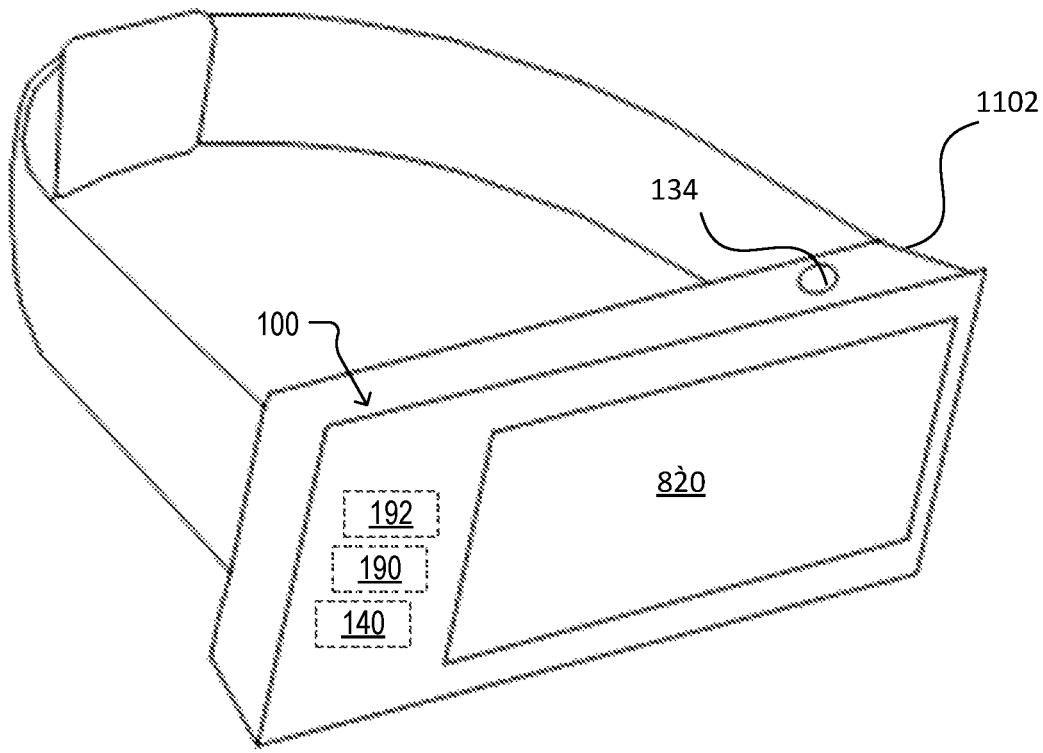
FIG. 11 illustrates a wearable electronic device that incorporates aspects of the device of FIG. 1, in accordance with some examples of the present disclosure.

FIG. 11 depicts an example of the device 100 integrated into a wearable electronic device 1102, illustrated as a "smart watch," that includes the display 820 and the sensors 134. The sensors 134 enable context detection, for example, based on modalities such as location, video, speech, and gesture, which the device 100 may use to update one or models used by the model-based application 192. The sensors 134 also enable detection of sounds and other events in an environment around the wearable electronic device 1102, which the device 100 may detect or interpret using the model-based application 192. For example, the device 100 provides the output 324 of FIG. 3 to the display 820 indicating that a recognized sound event is detected in audio data samples received from the sensors 134. In some implementations, the device 100 can perform an action responsive to recognizing a sound event, such as activating a camera or another one of the sensors 134 or providing haptic feedback to the user.

Figure 12:
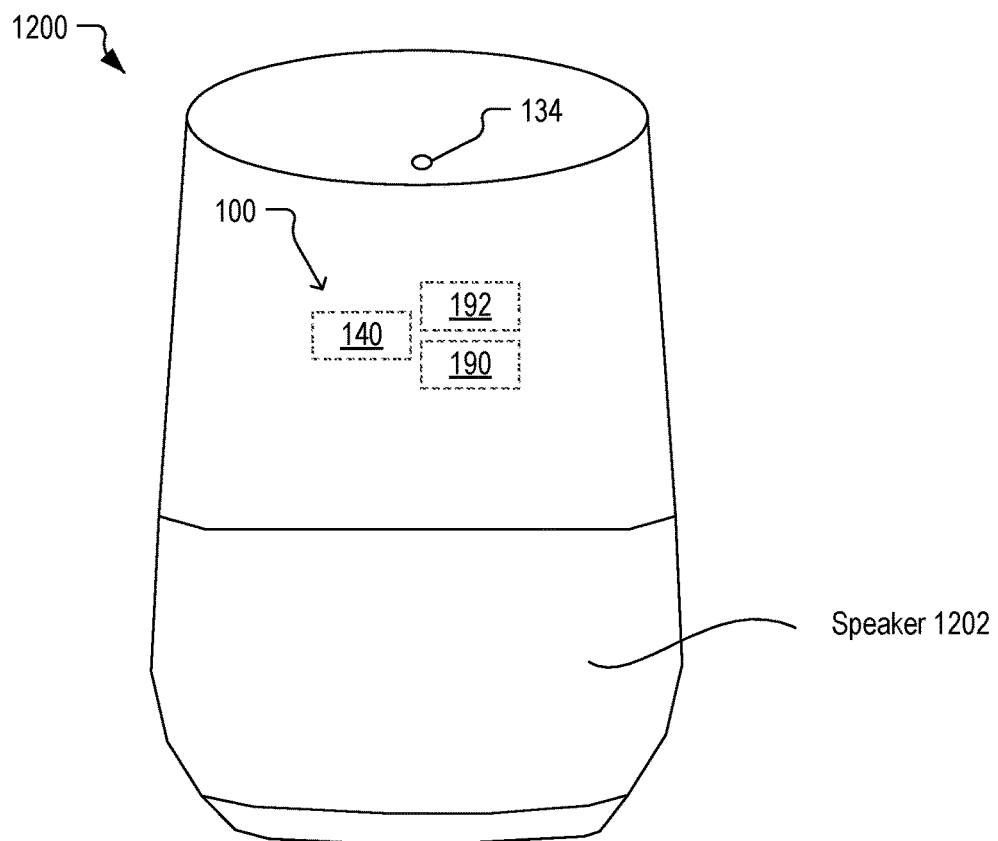
FIG. 12 illustrates a voice-controlled speaker system that incorporates aspects of the device of FIG. 1, in accordance with some examples of the present disclosure.

FIG. 12 is an illustrative example of a voice-controlled speaker system 1200. The voice-controlled speaker system 1200 can have wireless network connectivity and is configured to execute an assistant operation. In FIG. 12, the device 100 is included in the voice-controlled speaker system 1200. The voice-controlled speaker system 1200 also includes a speaker 1202 and sensors 134. The sensors 134 include microphone(s) 104 of FIG. 1 to receive voice input or other audio input.

During operation, in response to receiving a verbal command or a recognized sound event, the voice-controlled speaker system 1200 can execute assistant operations. The assistant operations can include adjusting a temperature, playing music, turning on lights, etc. The sensors 134 enable detection of data samples, which the device 100 may use to update a context of the voice-controlled speaker system 1200 and to update one or more models based on the context. Additionally, the voice-controlled speaker system 1200 can execute some operations based on events recognized by the device 100. For example, if the device 100 recognizes the sound of a door closing, the voice-controlled speaker system 1200 can turn on one or more lights.

Figure 13:
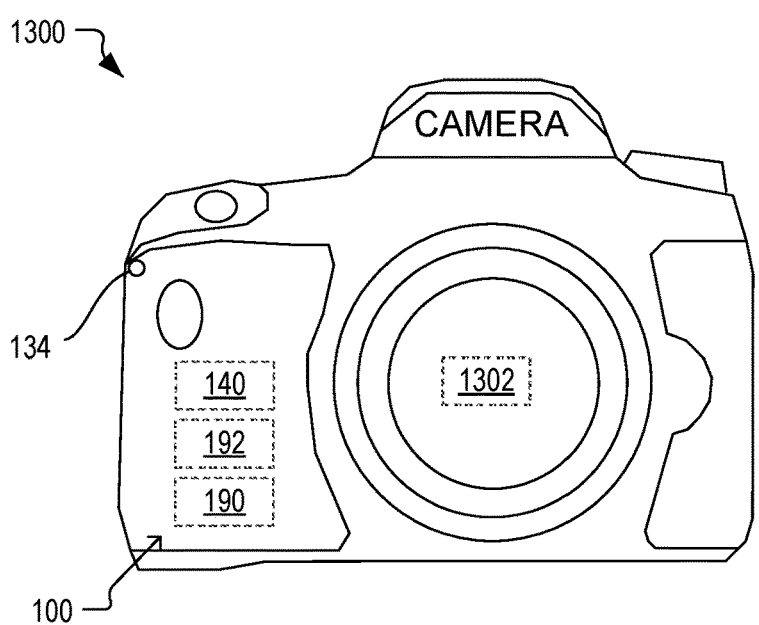
FIG. 13 illustrates a camera that incorporates aspects of the device of FIG. 1, in accordance with some examples of the present disclosure.

FIG. 13 illustrates a camera 1300 that incorporates aspects of the device 100 of FIG. 1. In FIG. 13, the device 100 is incorporated in or coupled to the camera 1300. The camera 1300 includes an image sensor 1302 and one or more other sensors (e.g., the sensors 134), such as the microphone(s) 104 of FIG. 1. Additionally, the camera 1300 includes the device 100, which is configured to determine a context of camera 1300 and to update one or more models based on the context. In a particular aspect, the camera 1300 is configured to perform one or more actions in response to a recognized sound event. For example, the camera 1300 may cause the image sensor 1302 to capture an image in response to the device 100 detecting a particular sound event in audio data samples from the sensors 134.

Figure 14:
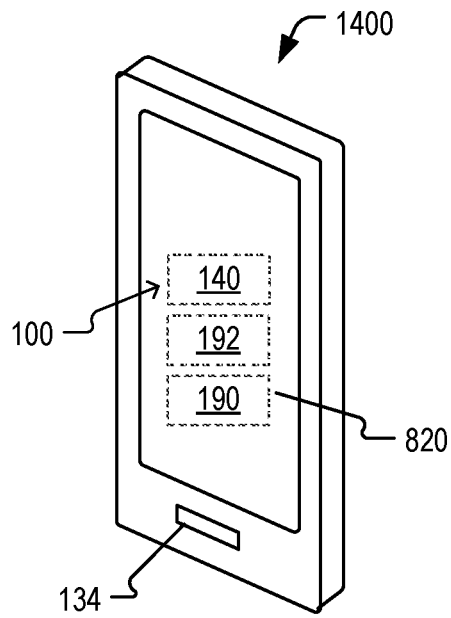
FIG. 14 illustrates a mobile device that incorporates aspects of the device of FIG. 1, in accordance with some examples of the present disclosure.

FIG. 14 illustrates a mobile device 1400 that incorporates aspects of the device 100 of FIG. 1. In FIG. 14, the mobile device 1400 includes or is coupled to the device 100 of FIG.

1. The mobile device 1400 includes a phone or tablet, as illustrative, non-limiting examples. The mobile device 1400 includes a display 820 and the sensors 134, such as the microphone(s) 104, the camera(s) 150, the location sensor(s) 152, or the other sensor(s) 156. During operation, the mobile device 1400 may perform particular actions in response to the device 100 recognizing a particular sound event. For example, the actions can include sending commands to other devices, such as a thermostat, a home automation system, another mobile device, etc.

Figure 15:
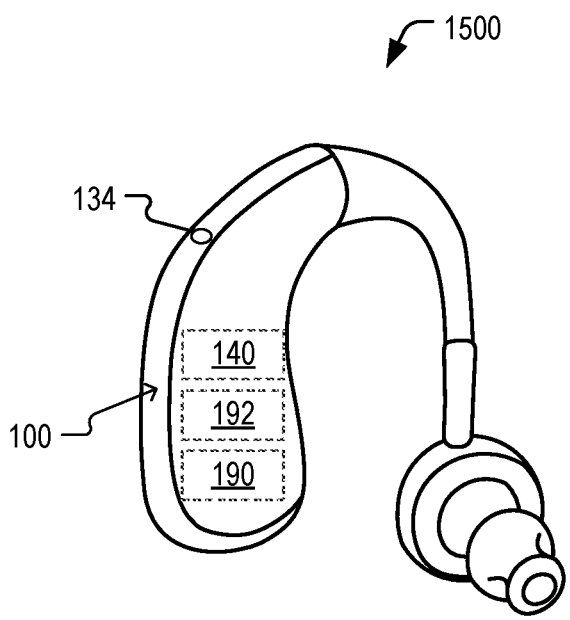
FIG. 15 illustrates a hearing aid device that incorporates aspects of the device of FIG. 1, in accordance with some examples of the present disclosure.

FIG. 15 illustrates a hearing aid device 1500 that incorporates aspects of the device 100 of FIG. 1. In FIG. 15, the hearing aid device 1500 includes or is coupled to the device 100 of FIG. 1. The hearing aid device 1500 includes the sensors 134, such as the microphone(s) 104, the camera(s) 150, the location sensor(s) 152, or the other sensor(s) 156. During operation, the hearing aid device 1500 may update one or more models in response to the device 100 recognizing a context of the hearing aid device 1500, such as an acoustic environment of the hearing aid device 1500, for use by the model-based application 192 for processing audio data, such as for location-specific noise reduction.

Figure 16:
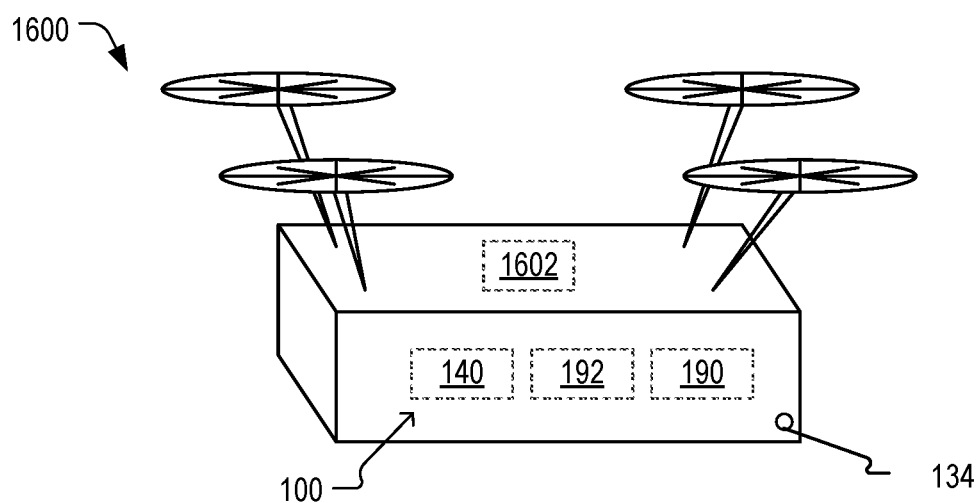
FIG. 16 illustrates an aerial device that incorporates aspects of the device of FIG. 1, in accordance with some examples of the present disclosure.

FIG. 16 illustrates an aerial device 1600 that incorporates aspects of the device 100 of FIG. 1. In FIG. 16, the aerial device 1600 includes or is coupled to the device 100 of FIG. 1. The aerial device 1600 is a manned, unmanned, or remotely piloted aerial device (e.g., a package delivery drone). The aerial device 1600 includes a control system 1602 and the sensors 134, such as the microphone(s) 104, the camera(s) 150, the location sensor(s) 152, or the other sensor(s) 156. The control system 1602 controls various operations of the aerial device 1600, such as cargo release, sensor activation, take-off, navigation, landing, or combinations thereof. For example, the control system 1602 may control flight of the aerial device 1600 between specified points and deployment of cargo at a particular location. During operation, the aerial device 1600 may update one or more models in response to the device 100 recognizing a context of the aerial device 1600, such as a location or acoustic environment of the aerial device 1600, for use by the model-based application 192 for detecting events. To illustrate, the control system 1602 may initiate a safe landing protocol in response to the device 100 detecting an aircraft engine.

Figure 17:
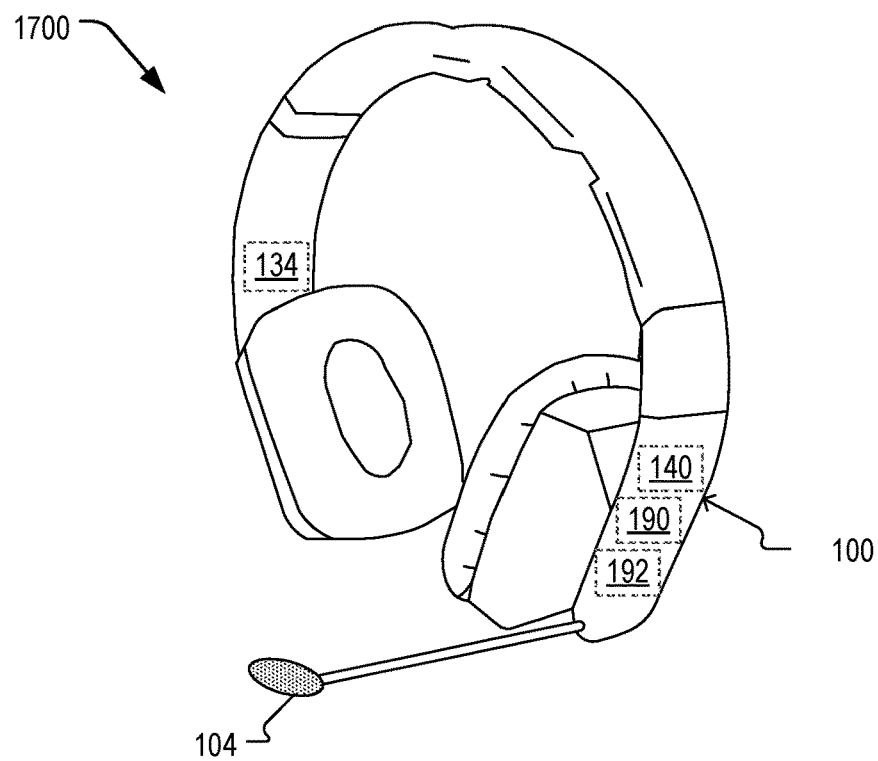
FIG. 17 illustrates a headset that incorporates aspects of the device of FIG. 1, in accordance with some examples of the present disclosure.

FIG. 17 illustrates a headset 1700 that incorporates aspects of the device 100 of FIG. 1. In FIG. 17, the headset 1700 includes or is coupled to the device 100 of FIG. 1. The headset 1700 includes one or more of the microphone(s) 104 of FIG. 1 positioned to primarily capture speech of a user. The headset 1700 may also include one or more additional microphone positioned to primarily capture environmental sounds (e.g., for noise canceling operations) and one or more of the sensors 134, such as the camera(s) 150, the location sensor(s) 152, or the other sensor(s) 156. In a particular aspect, the headset 1700 may update one or more models in response to the device 100 recognizing a change in context of the headset 1700, such as a location or acoustic environment of the headset 1700, for use by the model-based application 192 for performing operations such as a noise cancellation feature.

Figure 18:
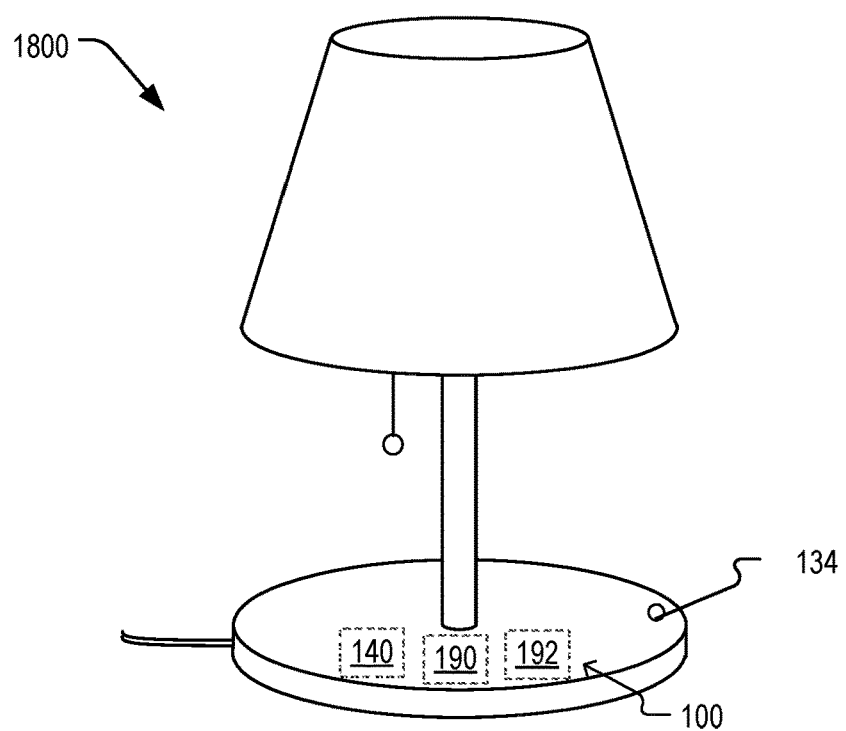
FIG. 18 illustrates an appliance that incorporates aspects of the device of FIG. 1, in accordance with some examples of the present disclosure.

FIG. 18 illustrates an appliance 1800 that incorporates aspects of the device 100 of FIG. 1. In FIG. 18, the appliance 1800 is a lamp; however, in other implementations, the appliance 1800 includes another Internet-of-Things appliance, such as a refrigerator, a coffee maker, an oven, another household appliance, etc. The appliance 1800 includes or is coupled to the device 100 of FIG. 1. The appliance 1800 includes the sensors 134, such as the microphone(s) 104, the camera(s) 150, the location sensor(s) 152, the activity detector 154, or the other sensor(s) 156. In a particular aspect, the appliance 1800 may update one or more models in response to the device 100 recognizing a change in context of the appliance 1800, for use by the model-based application 192 for performing operations such as to activate a light in response to the device 100 detecting a door closing.

Figure 19:
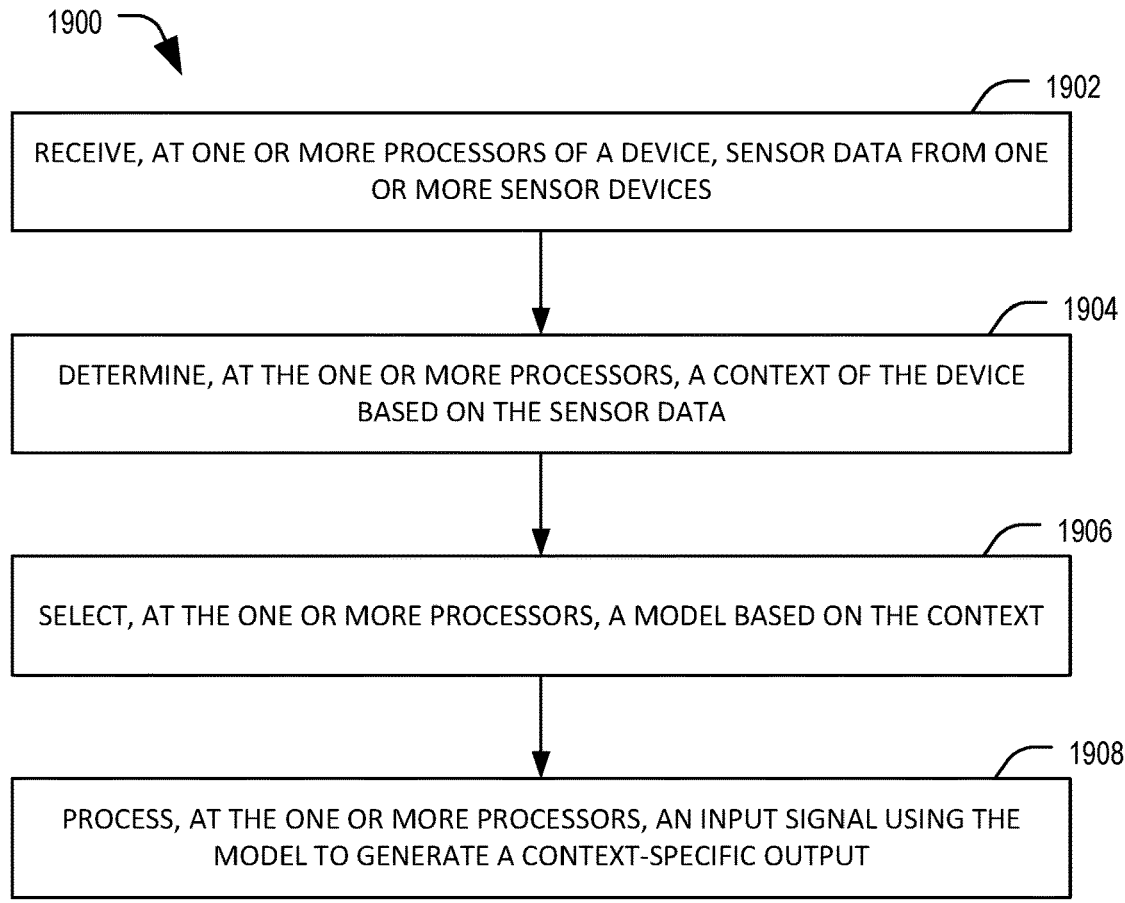
FIG. 19 is a flow chart illustrating an example of a method of operation of the device of FIG. 1, in accordance with some examples of the present disclosure.
Figure 20:
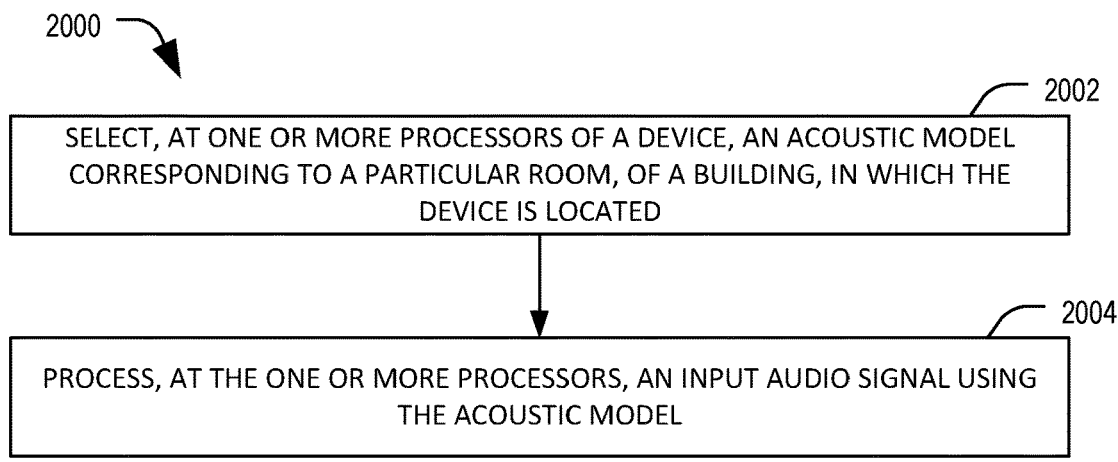
FIG. 20 is a flow chart illustrating an example of another method of operation of the device of FIG. 1, in accordance with some examples of the present disclosure.

FIG. 19 is a flow chart illustrating an example of a method 1900 of operation of the device 100 of FIG. 1. The method 1900 can be initiated, controlled, or performed by the device 100. For example, the processor(s) 110 can execute instructions, such as the instructions 860 of FIG. 8, from the memory 108 to perform context-based model selection.

The method 1900 includes, in block 1902, receiving, at one or more processors of a device, sensor data from one or more sensor devices. For example, the context detector 140 in the one or more processors 110 receives the sensor data 138 from the one or more sensor devices 134. In some implementations, the sensor data includes location data of a location of the device, such as the location data 153, and the context is at least partially based on the location. In some implementations, the sensor data includes image data corresponding to a visual scene, such as the image data 151, and the context is at least partially based on the visual scene. In some implementations, the sensor data includes audio corresponding to an audio scene, such as the audio data 105, and the context is at least partially based on audio scene. In some implementations, the sensor data includes motion data corresponding to motion of the device, such as the activity data 155, and the context is at least partially based on the motion of the device.

In block 1904, the method 1900 includes determining, at the one or more processors, a context of the device based on the sensor data. For example, the context detector 140 in the one or more processors 110 receives the sensor data 138 from the one or more sensor devices 134 and determines the context 142 based on the sensor data 138.

In block 1906, the method 1900 includes selecting, at the one or more processors, a model based on the context. For example, the model selector 190 selects the model 112 based on the context 142. In a particular implementation, the model is selected from among multiple models stored at a memory of the device, such as the available models 114. According to some implementations, the model is downloaded from a library, such as the model library 162, that corresponds to a library of shared models. The model may include a trained model uploaded to the library from another user device. In an example, the library corresponds to a crowdsourced library of models. The library may be included in a distributed context-aware system.

In block 1908, the method 1900 includes processing, at the one or more processors, an input signal using the model to generate a context-specific output. For example, the model-based application 192 processes the input signal 106 using the selected model 112 to generate the context-specific output 122.

In some implementations, the method 1900 includes pruning the model in response to determining that the context has changed. For example, the model selector 190 may permanently delete the model in response to detecting that the context 142 has changed (e.g., the device 100 is moved to a different location) and that the current model is no longer appropriate for the new context, or that another model is more appropriate for the new context.

In some implementations, the model includes a sound event detection model, the input signal includes an audio signal, and the context-specific output includes a classification of a sound event in the audio signal. In some implementations, the model includes an automatic speech recognition model, the input signal includes an audio signal, and the context-specific output includes text data representative of speech in the audio signal. In some implementations, the model includes a natural language processing (NLP) model, the input signal includes text data, and the context-specific output includes NLP output data based on the text data. In some implementations, the model includes a noise reduction model, the input signal includes an audio signal, and the context-specific output includes a noise reduced audio signal based on the audio signal. In some implementations, the model is associated with an automatic adjustment of a device operating mode, and wherein the context-specific output includes a signal to adjust the device operating mode.

In some implementations, the method 1900 includes receiving the model from a second device via wireless transmission. For example, the context may correspond to a location of the device, and the model includes an acoustic model corresponding to a particular location. In some implementations, the method 1900 includes receiving an access permission for the model at least partially based on the location of the device matching the particular location.

In some implementations, the context includes a particular acoustic environment, and the method 1900 includes determining whether a library of available acoustic models includes an acoustic model that is specific to the particular acoustic environment and available to the device and, in response to no acoustic model that is specific to the particular acoustic environment being available to the device, determining whether an acoustic model for a general category of the particular acoustic environment is available to the device. For example, in response to the model library 162 not having the "office" model 274 available for the device 100 when the device 100 is located in the room 204, the device 100 may request the "office building" model 262 for a general model of the acoustic environment for the room 204.

By selecting a model based on the context of the device, the method 1900 enables the device to perform with higher accuracy as compared to using a single model for all contexts. Further, changing models enables the device to perform with increased accuracy without incurring the power consumption, memory requirements, and processing resource usage associated with re-training an existing model from scratch at the device for a particular context. In addition, operation of the device using context-based models enables improved operation of the device itself, such as by enabling faster convergence when performing an iterative or dynamic process (e.g., in a noise cancellation technique) due to using a higher-accuracy model that is specific to the particular context.

FIG. 18 is a flow chart illustrating an example of a method 1800 of operation of the device 100 of FIG. 1. The method 1800 can be initiated, controlled, or performed by the device 100. For example, the processor(s) 110 can execute instructions, such as the instructions 660 of FIG. 6, from the memory 108 to perform context-based model selection.

The method 1800 includes, in block 1802, selecting, at one or more processors of a device, an acoustic model corresponding to a particular room, of a building, in which the device is located. For example, the model selector 190 selects the acoustic model 212 of FIG. 2 corresponding to the room 204 in which the device 100 is located.

The method 2000 includes, in block 2004, processing, at the one or more processors, an input audio signal using the acoustic model. As an illustrative example, the model-based application 192 uses the acoustic model 212 to perform noise reduction on the input signal 106 (e.g., the audio data 105 from the microphone(s) 104) to generate a noise-reduced audio signal as the context-specific output 122.

In some implementations, the method 2000 includes downloading the acoustic model from a library of acoustic models in response to a determination that the device has entered the particular room. In some implementations, the method 2000 includes pruning (e.g., removing) the acoustic model in response to the device leaving the particular room. In some implementations, the method 2000 includes selecting the acoustic model based on sensor data indicative of a location of the device, such as detecting a location of the device 100 by analyzing the image data 151. In some implementations, the method 2000 includes selecting the acoustic model based on location data indicative of a location of the device, such as the location data 153.

By selecting an acoustic model based on the context of the device, the method 2000 enables the device to perform with higher accuracy as compared to using a single acoustic model for all contexts. Further, changing acoustic models enables the device to perform with increased accuracy without incurring the power consumption, memory requirements, and processing resource usage associated with re-training an existing acoustic model from scratch at the device for a particular context. In addition, operation of the device using context-based acoustic models enables improved operation of the device itself, such as by enabling faster convergence when performing an iterative or dynamic process (e.g., in a noise cancellation technique) due to using a higher-accuracy acoustic model that is specific to the particular context.

Figure 21:
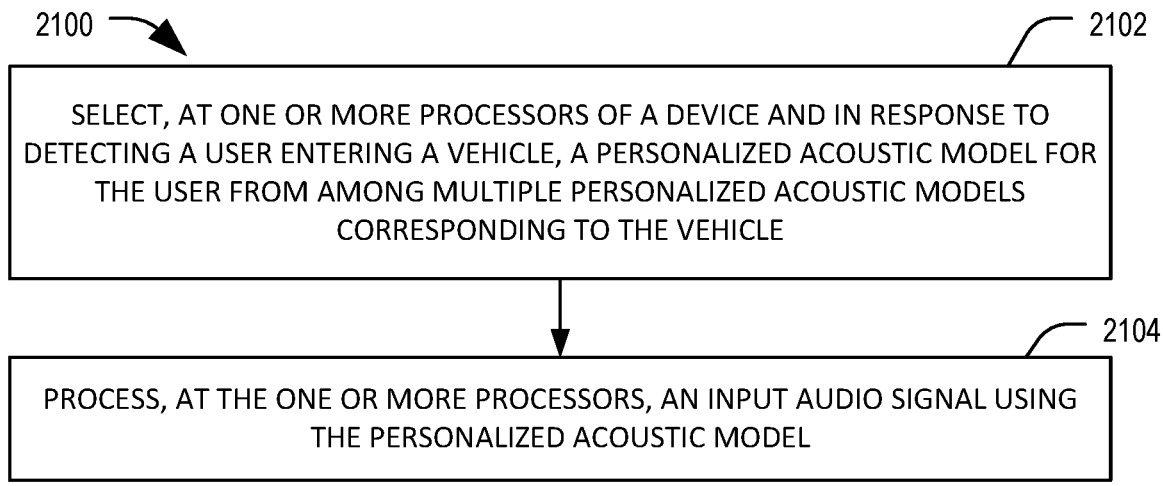
FIG. 21 is a flow chart illustrating an example of another method of operation of the device of FIG. 1, in accordance with some examples of the present disclosure.

FIG. 21 is a flow chart illustrating an example of a method 2100 of operation of the device 100 of FIG. 1 within a vehicle, such as integrated in the vehicle 900 of FIG. 9. The method 2100 can be initiated, controlled, or performed by the device 100. For example, the processor(s) 110 can execute instructions, such as the instructions 860 of FIG. 8, from the memory 108 to perform context-based model selection.

The method 2100 includes, in block 2102, selecting, at one or more processors of a device and in response to detecting a user entering a vehicle, a personalized acoustic model for the user from among multiple personalized acoustic models corresponding to the vehicle. For example, the device 100 in the vehicle 900 of FIG. 9 may store multiple acoustic models personalized for each user of the vehicle 900 and may select a personalized model or set of models for the particular user entering the vehicle 900. In some implementations, the method 2100 includes determining that the user has entered the vehicle based on sensor data indicative of a location of the user. To illustrate, the sensor(s) 134 of FIG. 9 may determine the user within the vehicle 900 via facial recognition, voice recognition, entry of an identification via gesture, voice, or interaction with an input device (e.g., a touchscreen in the vehicle 900), or one or more other techniques to identify the user.

The method 2100 includes, in block 2104, processing, at the one or more processors, an input audio signal using the personalized acoustic model. For example, in some implementations the personalized acoustic model corresponds to an ASR model trained for the particular user, and the personalized acoustic model is used by the model-based application 192 in the vehicle 900 to perform speech recognition for speech of the user that is captured via one or more microphones in the vehicle 900. To illustrate, the ASR model is used to enhance accuracy of a voice interface to control one or more operations of the vehicle 900 (e.g., a navigation system, an entertainment system, climate control, driver assistance or self-driving settings, etc.). As another example, the personalized acoustic model can include a SEC model that is personalized for the particular user. To illustrate, if the particular user frequently brings the user's dog on driving trips, the user's personalized SEC model for use in the vehicle 900 may be trained to recognize the additional sound class of "dog barking inside vehicle."

In some implementations, the method 2100 includes downloading the personalized acoustic model from a library of acoustic models in response to a determination that the user has entered the vehicle. In some implementations, the method 2100 includes pruning (e.g., removing) the personalized acoustic model in response to the device leaving the vehicle.

By selecting a personalized acoustic model in response to detecting a user entering the vehicle, the method 2100 enables the device to perform with higher accuracy as compared to using a single acoustic model for all contexts. Further, changing acoustic models enables the device to perform with increased accuracy without incurring the power consumption, memory requirements, and processing resource usage associated with re-training an existing acoustic model from scratch at the device for a particular context. In addition, operation of the device using context-based acoustic models enables improved operation of the device itself, such as by enabling faster convergence when performing an iterative or dynamic process (e.g., in a noise cancellation technique) due to using a higher-accuracy acoustic model that is specific to the particular context.

Figure 22:
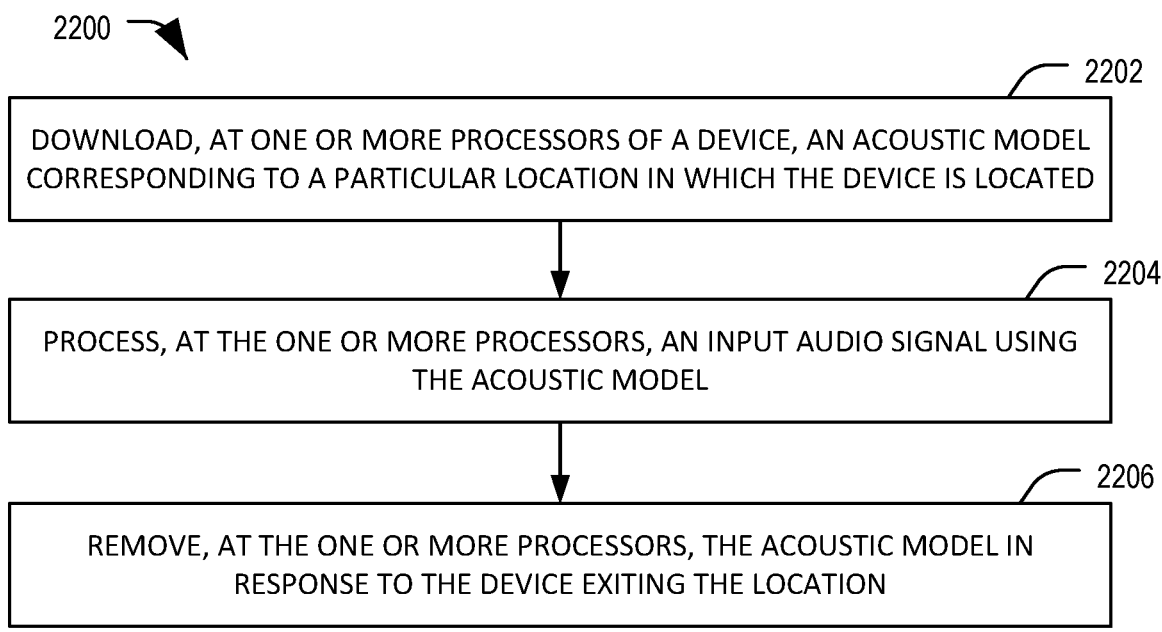
FIG. 22 is a flow chart illustrating an example of another method of operation of the device of FIG. 1, in accordance with some examples of the present disclosure.

FIG. 22 is a flow chart illustrating an example of a method 2200 of operation of the device 100 of FIG. 1. The method 2200 can be initiated, controlled, or performed by the device 100. For example, the processor(s) 110 can execute instructions, such as the instructions 860 of FIG. 8, from the memory 108 to perform context-based model selection.

The method 2200 includes, in block 2202, downloading, at one or more processors of a device, an acoustic model corresponding to a particular location in which the device is located. In some implementations, the method 2200 includes determining that the device has entered the particular location based on sensor data indicative of a location of the device. In an example, the device 100 downloads the acoustic model 212 (e.g., the "office" model 274 corresponding to the room 204) in response to the device 100 entering the room 204 or determining that the location of the device is within the room 204 (e.g., based on the location data 153).

The method 2200 includes, in block 2204, processing, at the one or more processors, an input audio signal using the acoustic model. In an example, the device 100 corresponds to the hearing aid device 1500 of FIG. 15 and uses the acoustic model 212 (e.g., the "office" model 274 corresponding to the room 204) to perform noise reduction at the model-based application 192.

The method 2200 includes, in block 2206, removing, at the one or more processors, the acoustic model in response to the device exiting the location. In some implementations, the method 2200 includes determining that the device has entered the particular location based on location data indicative of a location of the device. In an example, the device 100 prunes the acoustic model 212 (e.g., the "office" model 274 corresponding to the room 204) in response to the device 100 exiting the room 204 or determining that the location of the device is no longer within the room 204 (e.g., based on the location data 153).

Although the example provided above illustrate the method 2200 performed in the building 202 of FIG. 2, it should be understood that the method 2200 is not limited to any particular location or location type. For example, in some implementations, the location corresponds to a particular restaurant, and the acoustic model is downloaded from a library of acoustic models in response to a determination that the device has entered the particular restaurant. In other implementations, the location can correspond to a public park, a subway station, a car, a train, a plane, a particular room in the user's house, a particular room in a museum, an auditorium or concert hall, etc.

By selecting an acoustic model corresponding to the particular location of the device, the method 2200 enables the device to perform with higher accuracy as compared to using a single acoustic model for all locations. Further, changing acoustic models enables the device to perform with increased accuracy without incurring the power consumption, memory requirements, and processing resource usage associated with re-training an existing acoustic model from scratch at the device for a particular context, and removing the acoustic model in response to the device exiting the location improves operation of the device by freeing memory and resources associated with continuing to store the acoustic model when no longer in use, which enables reduce power consumption associated with model storage and latency associated with subsequent searches of acoustic models that are stored at the device. In addition, operation of the device using location-based acoustic models enables improved operation of the device itself, such as by enabling faster convergence when performing an iterative or dynamic process (e.g., in a noise cancellation technique) due to using a higher-accuracy acoustic model that is specific to the particular location.

Figure 23:
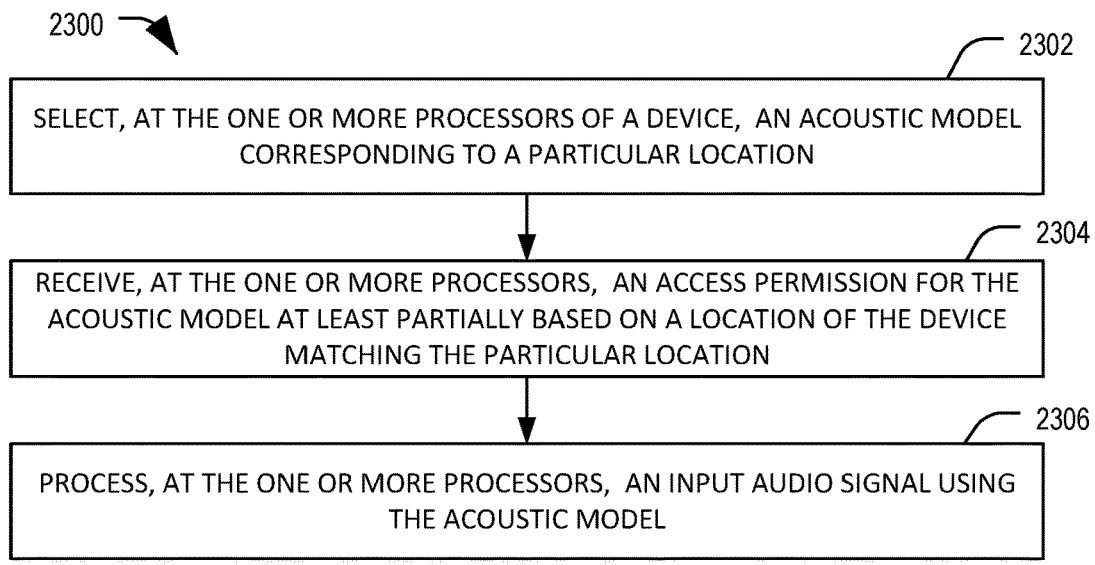
FIG. 23 is a flow chart illustrating an example of another method of operation of the device of FIG. 1, in accordance with some examples of the present disclosure.

FIG. 23 is a flow chart illustrating an example of a method 2300 of operation of the device 100 of FIG. 1. The method 2300 can be initiated, controlled, or performed by the device 100. For example, the processor(s) 110 can execute instructions, such as the instructions 860 of FIG. 8, from the memory 108 to perform context-based model selection.

The method 2300 includes, in block 2302, selecting, at the one or more processors of a device, an acoustic model corresponding to a particular location.

The method 2300 includes, in block 2304, receiving, at the one or more processors, an access permission for the acoustic model at least partially based on a location of the device matching the particular location. In some implementations, the method 2300 includes receiving the access permission in response to detection of the device within the particular location. For example, the device 100 may receive the access permissions 214 to use the "office" model 274 of FIG. 2 in response to detection of the device 100 in the room 204. The device 100 may transmit the data indicating the acoustic environment 210, such as location data, and in response a permissions management system may send the access permissions to the device 100, such as described with reference to FIG. 2.

The method 2300 includes, in block 2306, processing, at the one or more processors, an input audio signal using the acoustic model.

By selecting an acoustic model corresponding to the particular location of the device, the method 2300 enables the device to perform with higher accuracy as compared to using a single acoustic model for all locations. Further, receiving access permission for the acoustic model based on location matching enables security of the acoustic model to be maintained by preventing use of the acoustic model other than when the device is in the particular location. Such security enables the acoustic model to be downloaded to the device as embargoed data, such as to reduce peak network bandwidth usage and to reduce the latency associated with using the acoustic model because the acoustic model may already be stored at the device and need not be downloaded upon entering the particular location. In addition, operation of the device using location-based acoustic models enables improved operation of the device itself, such as by enabling faster convergence when performing an iterative or dynamic process (e.g., in a noise cancellation technique) due to using a higher-accuracy acoustic model that is specific to the particular location.

Figure 24:
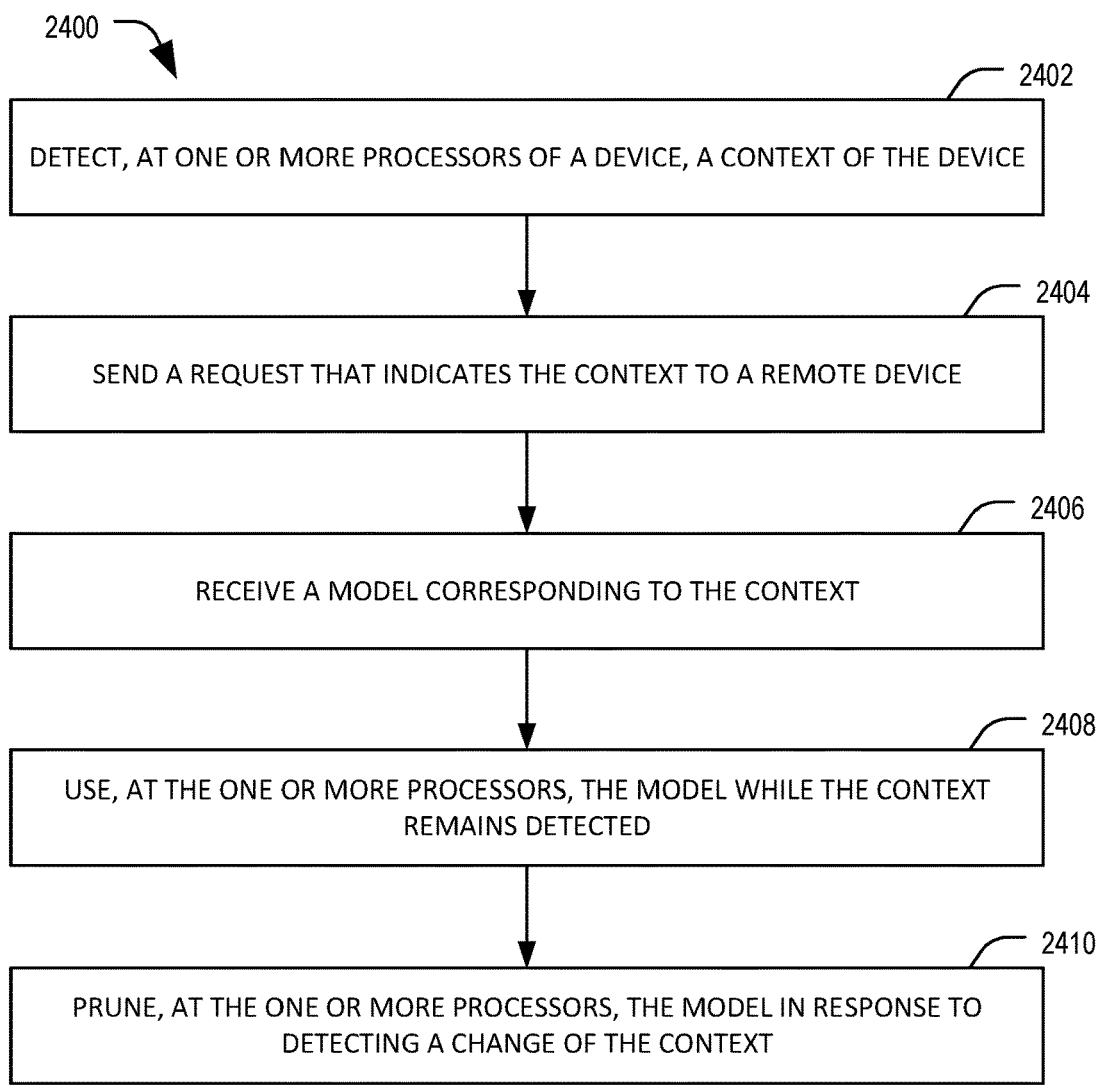
FIG. 24 is a flow chart illustrating an example of another method of operation of the device of FIG. 1, in accordance with some examples of the present disclosure.

FIG. 24 is a flow chart illustrating an example of a method 2400 of operation of the device 100 of FIG. 1. The method 2400 can be initiated, controlled, or performed by the device 100. For example, the processor(s) 110 can execute instructions, such as the instructions 860 of FIG. 8, from the memory 108 to perform context-based model selection.

The method 2400 includes, in block 2402, detecting, at one or more processors of a device, a context of the device. To illustrate, in some implementations, the one or more processors 110 are configured to detect the context, such as the context 142 detected by the context detector 142 based on the sensor data 138. In illustrative, non-limiting examples, the context corresponds to a location or activity, such as driving in a car, The method 2400 includes, in block 2404, sending a request that indicates the context to a remote device. To illustrate, in some implementations, the one or more processors 110 are configured to initiate sending the request that indicates the context (e.g., the acoustic environment 210) to a remote device, such as the remote computing device 818 (e.g., a server (which may be part of a service) or network memory storing at least a portion of the model library 162).

The method 2400 includes, in block 2406, receiving a model corresponding to the context. To illustrate, in some implementations, the one or more processors 110 are configured to receive the model 112 from the remote computing device 818 or another server or network memory storing at least a portion of the model library 162 in response to sending the request indicating the context. In some implementations, the model 112 is received as a compressed source model and is decompressed by the one or more processors 110 for use at the device 100. In some implementations, the model is received based on private access. In an illustrative example, the acoustic model 212 is received in conjunction with the access permissions 214 that authorize the device 100 to access the acoustic model 212 (e.g., in conjunction with a license to use the model 212). In an illustrative example, the model is received based on access granted by family or friends of a user of the device 100.

The method 2400 includes, in block 2408, using, at the one or more processors, the model while the context remains detected. To illustrate, in some implementations, the one or more processors 110 are configured to receive the model 112 in response to sending the request indicating the the context 142 and to continue using the model 112 at the model-based application 192 while the context 142 remains unchanged (e.g., use the received model 112 temporarily as long as the context 142 is detected).

The method 2400 includes, in block 2410, pruning, at the one or more processors, the model in response to detecting a change of the context. To illustrate, in some implementations, the one or more processors 110 are configured to prune the model 112 in response to detecting a change of the context 142 (e.g., prune the model 112 once context changes). In some implementations, pruning the model includes permanently deleting the model.

In some implementations, the method 2400 includes generating at least one new sound class while the context remains detected, and pruning the model includes preserving the at least one new sound class. To illustrate, in some implementations, the one or more processors 110 are configured to generate new sound classes, such as by generating updated models or new models as described with reference to FIGS. 3-5 (e.g., the update model 506), which are preserved by storing the updated or new models, such as at the memory 108 or via upload to the model library 162.

In conjunction with the described implementations, an apparatus includes means for receiving sensor data. For example, the means receiving sensor data includes the device 100, the instructions 860, the processor 804, the processor(s) 806, context detector 140, the microphone(s) 104, the camera(s) 150, the location sensor(s) 152, the activity detector 154, the other sensor(s) 156, the CODEC 824, one or more other circuits or components configured to receive sensor data, or any combination thereof.

The apparatus also includes means for determining a context based on the sensor data. For example, the means for determining the context based on the sensor data includes the device 100, the instructions 860, the processor 804, the processor(s) 806, the context detector 140, one or more other circuits or components configured to determine a context based on the sensor data, or any combination thereof.

The apparatus also includes means for selecting a model based on the context. For example, the means for selecting a model based on the context includes the device 100, the instructions 860, the processor 804, the processor(s) 806, the model selector 190, one or more other circuits or components configured to select a model based on the context, or any combination thereof.

The apparatus also includes means for processing an input signal using the model to generate a context-specific output. For example, the means for processing an input signal using the model to generate a context-specific output includes the device 100, the instructions 860, the processor 804, the processor(s) 806, the model-based application 192, one or more other circuits or components configured to process an input signal using the model to generate a context-specific output, or any combination thereof.

Those of skill would further appreciate that the various illustrative logical blocks, configurations, modules, circuits, and algorithm steps described in connection with the implementations disclosed herein may be implemented as electronic hardware, computer software executed by a processor, or combinations of both. Various illustrative components, blocks, configurations, modules, circuits, and steps have been described above generally in terms of their functionality. Whether such functionality is implemented as hardware or processor executable instructions depends upon the particular application and design constraints imposed on the overall system. Skilled artisans may implement the described functionality in varying ways for each particular application, such implementation decisions are not to be interpreted as causing a departure from the scope of the present disclosure.

The steps of a method or algorithm described in connection with the implementations disclosed herein may be embodied directly in hardware, in a software module executed by a processor, or in a combination of the two. A software module may reside in random access memory (RAM), flash memory, read-only memory (ROM), programmable read-only memory (PROM), erasable programmable read-only memory (EPROM), electrically erasable programmable read-only memory (EEPROM), registers, hard disk, a removable disk, a compact disc read-only memory (CD-ROM), or any other form of non-transient storage medium known in the art. An exemplary storage medium is coupled to the processor such that the processor may read information from, and write information to, the storage medium. In the alternative, the storage medium may be integral to the processor. The processor and the storage medium may reside in an application-specific integrated circuit (ASIC). The ASIC may reside in a computing device or a user terminal. In the alternative, the processor and the storage medium may reside as discrete components in a computing device or user terminal.

Particular aspects of the disclosure are described below in a first set of interrelated clauses:

According to Clause 1, a device includes one or more processors configured to: receive sensor data from one or more sensor devices; determine a context of the device based on the sensor data; select a model based on the context; and process an input signal using the model to generate a context-specific output.

Clause 2 includes the device of Clause 1, and further includes a location sensor coupled to the one or more processors, wherein the sensor data includes location data from the location sensor, the location data indicative of a location of the device, and wherein the context is at least partially based on the location.

Clause 3 includes the device of Clause 1 or Clause 2, and further includes a camera coupled to the one or more processors, wherein the sensor data includes image data from the camera, the image data corresponding to a visual scene, and wherein the context is at least partially based on the visual scene.

Clause 4 includes the device of any of Clauses 1 to 3, and further includes a microphone coupled to the one or more processors, wherein the sensor data includes audio data from the microphone, the audio data corresponding to an audio scene, and wherein the context is at least partially based on audio scene.

Clause 5 includes the device of any of Clauses 1 to 4, and further includes an activity detector coupled to the one or more processors, wherein the sensor data includes motion data from the activity detector, the motion data corresponding to motion of the device, and wherein the context is at least partially based on the motion of the device.

Clause 6 includes the device of any of Clauses 1 to 5, and further includes a memory coupled to the one or more processors, wherein the model is selected from among multiple models stored at the memory.

Clause 7 includes the device of any of Clauses 1 to 6, wherein the model includes a sound event detection model, the input signal includes an audio signal, and the context-specific output includes a classification of a sound event in the audio signal.

Clause 8 includes the device of any of Clauses 1 to 7, wherein the model includes an automatic speech recognition model, the input signal includes an audio signal, and the context-specific output includes text data representative of speech in the audio signal.

Clause 9 includes the device of any of Clauses 1 to 8, wherein the model includes a natural language processing (NLP) model, the input signal includes text data, and the context-specific output includes NLP output data based on the text data.

Clause 10 includes the device of any of Clauses 1 to 9, wherein the model includes a noise reduction model, the input signal includes an audio signal, and the context-specific output includes a noise reduced audio signal based on the audio signal.

Clause 11 includes the device of any of Clauses 1 to 10, wherein the model is associated with an automatic adjustment of a device operating mode, and wherein the context-specific output includes a signal to adjust the device operating mode.

Clause 12 includes the device of any of Clauses 1 to 11, and further includes a modem coupled to the one or more processors and configured to receive the model from a second device via wireless transmission.

Clause 13 includes the device of Clause 12, wherein the context corresponds to a location of the device, and wherein the model includes an acoustic model corresponding to a particular location.

Clause 14 includes the device of Clause 13, wherein the one or more processors are further configured to receive, via the modem, an access permission for the model at least partially based on the location of the device matching the particular location.

Clause 15 includes the device of any of Clauses 1 to 14, wherein the one or more processors are further configured to prune the model in response to determining that the context has changed.

Clause 16 includes the device of any of Clauses 1 to 15, wherein the model is downloaded from a library of shared models.

Clause 17 includes the device of Clause 16, wherein the model includes a trained model uploaded to the library from another user device.

Clause 18 includes the device of Clause 16 or Clause 17, wherein the library corresponds to a crowdsourced library of models.

Clause 19 includes the device of any of Clauses 16 to Clause 18, wherein the library is included in a distributed context-aware system.

Clause 20 includes the device of any of Clauses 1 to 19, wherein the context includes a particular acoustic environment, and wherein the one or more processors are configured to: determine whether a library of available acoustic models includes an acoustic model that is specific to the particular acoustic environment and available to the one or more processors; and in response to no acoustic model that is specific to the particular acoustic environment being available to the one or more processors, determine whether an acoustic model for a general category of the particular acoustic environment is available to the one or more processors.

Clause 21 includes the device of any of Clauses 1 to 20, wherein the one or more processors are integrated in integrated circuit.

Clause 22 includes the device of any of Clauses 1 to 20, wherein the one or more processors are integrated in a vehicle.

Clause 23 includes the device of any of Clauses 1 to 20, wherein the one or more processors are integrated in at least one of a mobile phone, a tablet computer device, a virtual reality headset, an augmented reality headset, a mixed reality headset, a wireless speaker device, a wearable device, a camera device, or a hearing aid device.

Particular aspects of the disclosure are described below in a second set of interrelated clauses:

According to Clause 24, a method includes receiving, at one or more processors of a device, sensor data from one or more sensor devices; determining, at the one or more processors, a context of the device based on the sensor data;

selecting, at the one or more processors, a model based on the context; and processing, at the one or more processors, an input signal using the model to generate a context-specific output.

Clause 25 includes the method of Clause 24, wherein the sensor data includes location data of a location of the device, and wherein the context is at least partially based on the location.

Clause 26 includes the method of Clause 24 or Clause 25, wherein the sensor data includes image data corresponding to a visual scene, and wherein the context is at least partially based on the visual scene.

Clause 27 includes the method of any of Clauses 24 to 26, wherein the sensor data includes audio corresponding to an audio scene, and wherein the context is at least partially based on audio scene.

Clause 28 includes the method of any of Clauses 24 to 27, wherein the sensor data includes motion data corresponding to motion of the device, and wherein the context is at least partially based on the motion of the device.

Clause 29 includes the method of any of Clauses 24 to 28, wherein the model is selected from among multiple models stored at a memory of the device.

Clause 30 includes the method of any of Clauses 24 to 29, wherein the model includes a sound event detection model, the input signal includes an audio signal, and the context-specific output includes a classification of a sound event in the audio signal.

Clause 31 includes the method of any of Clauses 24 to 30, wherein the model includes an automatic speech recognition model, the input signal includes an audio signal, and the context-specific output includes text data representative of speech in the audio signal.

Clause 32 includes the method of any of Clauses 24 to 31, wherein the model includes a natural language processing (NLP) model, the input signal includes text data, and the context-specific output includes NLP output data based on the text data.

Clause 33 includes the method of any of Clauses 24 to 32, wherein the model includes a noise reduction model, the input signal includes an audio signal, and the context-specific output includes a noise reduced audio signal based on the audio signal.

Clause 34 includes the method of any of Clauses 24 to 33, wherein the model is associated with an automatic adjustment of a device operating mode, and wherein the context-specific output includes a signal to adjust the device operating mode.

Clause 35 includes the method of any of Clauses 24 to 34, and further includes receiving the model from a second device via wireless transmission.

Clause 36 includes the method of any of Clauses 24 to 35, wherein the context corresponds to a location of the device, and wherein the model includes an acoustic model corresponding to a particular location.

Clause 37 includes the method of Clause 36, and further includes receiving an access permission for the model at least partially based on the location of the device matching the particular location.

Clause 38 includes the method of any of Clauses 24 to 37, and further includes pruning the model in response to determining that the context has changed.

Clause 39 includes the method of any of Clauses 24 to 38, wherein the model is downloaded from a library of shared models.

Clause 40 includes the method of Clause 39, wherein the model includes a trained model uploaded to the library from another user device.

Clause 41 includes the method of Clause 39 or Clause 40, wherein the library corresponds to a crowdsourced library of models.

Clause 42 includes the method of any of Clauses 39 to 41, wherein the library is included in a distributed context-aware system.

Clause 43 includes the method of any of Clauses 24 to 42, wherein the context includes a particular acoustic environment, and further includes: determining whether a library of available acoustic models includes an acoustic model that is specific to the particular acoustic environment and available to the device; and in response to no acoustic model that is specific to the particular acoustic environment being available to the device, determining whether an acoustic model for a general category of the particular acoustic environment is available to the device.

Particular aspects of the disclosure are described below in a third set of interrelated clauses:

According to Clause 44, a device includes means for receiving sensor data; means for determining a context based on the sensor data; means for selecting a model based on the context; and means for processing an input signal using the model to generate a context-specific output.

Clause 45 includes the device of Clause 44, wherein the sensor data includes location data of a location of the device, and wherein the context is at least partially based on the location.

Clause 46 includes the device of Clause 44 or Clause 45, wherein the sensor data includes image data corresponding to a visual scene, and wherein the context is at least partially based on the visual scene.

Clause 47 includes the device of any of Clauses 44 to 46, wherein the sensor data includes audio corresponding to an audio scene, and wherein the context is at least partially based on audio scene.

Clause 48 includes the device of any of Clauses 44 to 47, wherein the sensor data includes motion data corresponding to motion of the device, and wherein the context is at least partially based on the motion of the device.

Clause 49 includes the device of any of Clauses 44 to 48, and further includes means for storing models, wherein the model is selected from among multiple models stored at the means for storing models.

Clause 50 includes the device of any of Clauses 44 to 49, wherein the model includes a sound event detection model, the input signal includes an audio signal, and the context-specific output includes a classification of a sound event in the audio signal.

Clause 51 includes the device of any of Clauses 44 to 50, wherein the model includes an automatic speech recognition model, the input signal includes an audio signal, and the context-specific output includes text data representative of speech in the audio signal.

Clause 52 includes the device of any of Clauses 44 to 51, wherein the model includes a natural language processing (NLP) model, the input signal includes text data, and the context-specific output includes NLP output data based on the text data.

Clause 53 includes the device of any of Clauses 44 to 52, wherein the model includes a noise reduction model, the input signal includes an audio signal, and the context-specific output includes a noise reduced audio signal based on the audio signal.

Clause 54 includes the device of any of Clauses 44 to 53, wherein the model is associated with an automatic adjustment of a device operating mode, and wherein the context-specific output includes a signal to adjust the device operating mode.

Clause 55 includes the device of any of Clauses 44 to 54, wherein the model is received from a second device via wireless transmission.

Clause 56 includes the device of any of Clauses 44 to 55, wherein the context corresponds to a location of the device, and wherein the model includes an acoustic model corresponding to a particular location.

Clause 57 includes the device of Clause 56, wherein an access permission for the model is received at least partially based on the location of the device matching the particular location.

Clause 58 includes the device of Clause 56, and further includes means for removing the model in response to the device leaving the particular location.

Clause 59 includes the device of any of Clauses 44 to 58, wherein the model is downloaded from a library of shared models.

Clause 60 includes the device of Clause 59, wherein the model includes a trained model uploaded to the library from another user device.

Clause 61 includes the device of Clause 59 or Clause 60, wherein the library corresponds to a crowdsourced library of models.

Clause 62 includes the device of any of Clauses 59 to 61, wherein the library is included in a distributed context-aware system.

Particular aspects of the disclosure are described below in a fourth set of interrelated clauses:

According to Clause 63, a non-transitory computer-readable storage medium comprising instructions that, when executed by a processor of a device, cause the processor to: receive sensor data from one or more sensor devices; determine a context on the sensor data; select a model based on the context; and process an input signal using the model to generate a context-specific output.

Clause 64 includes the non-transitory computer-readable storage medium of Clause 63, wherein the sensor data includes location data of a location of the device, and wherein the context is at least partially based on the location.

Clause 65 includes the non-transitory computer-readable storage medium of Clause 63 or Clause 64, wherein the sensor data includes image data corresponding to a visual scene, and wherein the context is at least partially based on the visual scene.

Clause 66 includes the non-transitory computer-readable storage medium of any of Clauses 63 to 65, wherein the sensor data includes audio corresponding to an audio scene, and wherein the context is at least partially based on audio scene.

Clause 67 includes the non-transitory computer-readable storage medium of any of Clauses 63 to 66, wherein the sensor data includes motion data corresponding to motion of the device, and wherein the context is at least partially based on the motion of the device.

Clause 68 includes the non-transitory computer-readable storage medium of any of Clauses 63 to 67, wherein the model is selected from among multiple models stored at a memory of the device.

Clause 69 includes the non-transitory computer-readable storage medium of any of Clauses 63 to 68, wherein the model includes a sound event detection model, the input signal includes an audio signal, and the context-specific output includes a classification of a sound event in the audio signal.

Clause 70 includes the non-transitory computer-readable storage medium of any of Clauses 63 to 69, wherein the model includes an automatic speech recognition model, the input signal includes an audio signal, and the context-specific output includes text data representative of speech in the audio signal.

Clause 71 includes the non-transitory computer-readable storage medium of any of Clauses 63 to 70, wherein the model includes a natural language processing (NLP) model, the input signal includes text data, and the context-specific output includes NLP output data based on the text data.

Clause 72 includes the non-transitory computer-readable storage medium of any of Clauses 63 to 71, wherein the model includes a noise reduction model, the input signal includes an audio signal, and the context-specific output includes a noise reduced audio signal based on the audio signal.

Clause 73 includes the non-transitory computer-readable storage medium of any of Clauses 63 to 72, wherein the model is associated with an automatic adjustment of a device operating mode, and wherein the context-specific output includes a signal to adjust the device operating mode.

Clause 74 includes the non-transitory computer-readable storage medium of any of Clauses 63 to 73, wherein the instructions further cause the processor to receive the model from a second device via wireless transmission.

Clause 75 includes the non-transitory computer-readable storage medium of any of Clauses 63 to 74, wherein the context corresponds to a location of the device, and wherein the model includes an acoustic model corresponding to a particular location.

Clause 76 includes the non-transitory computer-readable storage medium of Clause 75, wherein the instructions further cause the processor to receive an access permission for the model at least partially based on the location of the device matching the particular location.

Clause 77 includes the non-transitory computer-readable storage medium of Clause 75, wherein the instructions further cause the processor to remove the model in response to the device leaving the particular location.

Clause 78 includes the non-transitory computer-readable storage medium of any of Clauses 63 to 77, wherein the model is downloaded from a library of shared models.

Clause 79 includes the non-transitory computer-readable storage medium of Clause 78, wherein the model includes a trained model uploaded to the library from another user device.

Clause 80 includes the non-transitory computer-readable storage medium of Clause 78 or Clause 79, wherein the library corresponds to a crowdsourced library of models.

Clause 81 includes the non-transitory computer-readable storage medium of any of Clauses 78 to 80, wherein the library is included in a distributed context-aware system.

Clause 82 includes the non-transitory computer-readable storage medium of any of Clauses 63 to 81, wherein the context includes a particular acoustic environment, and wherein the instructions further cause the processor to: determine whether a library of available acoustic models includes an acoustic model that is specific to the particular acoustic environment and available to the device; and in response to no acoustic model that is specific to the particular acoustic environment being available to the device, determine whether an acoustic model for a general category of the particular acoustic environment is available to the device.

Particular aspects of the disclosure are described below in a fifth set of interrelated clauses:

According to Clause 83, a device includes one or more processors configured to: select an acoustic model corresponding to a particular room, of a building, in which the device is located; and process an input audio signal using the acoustic model.

Clause 84 includes the device of Clause 83, wherein the one or more processors are configured to download the acoustic model from a library of acoustic models in response to a determination that the device has entered the particular room.

Clause 85 includes the device of Clause 83 or 84, wherein the one or more processors are further configured to remove the acoustic model in response to the device leaving the particular room.

Clause 86 includes the device of any of Clauses 83 to 85, and further includes one or more microphones configured to generate the input audio signal.

Clause 87 includes the device of any of Clauses 83 to 86, and further includes one or more sensor devices coupled to the one or more processors and configured to generate sensor data indicative of a location of the device, and wherein the one or more processors are configured to select the acoustic model based on the sensor data.

Clause 88 includes the device of any of Clause 83 to 87, and further includes a modem coupled to the one or more processors and configured to receive location data indicative of a location of the device, and wherein the one or more processors are configured to select the acoustic model based on the location data.

Particular aspects of the disclosure are described below in a sixth set of interrelated clauses:

According to Clause 89, a method includes: selecting, at one or more processors of a device, an acoustic model corresponding to a particular room, of a building, in which the device is located; and processing, at the one or more processors, an input audio signal using the acoustic model.

Clause 90 includes the method of Clause 89, and further includes downloading the acoustic model from a library of acoustic models in response to a determination that the device has entered the particular room.

Clause 91 includes the method of Clause 89 or Clause 90, and further includes removing the acoustic model in response to the device leaving the particular room.

Clause 92 includes the method of any of Clauses 89 to 91, and further includes selecting the acoustic model based on sensor data indicative of a location of the device.

Clause 93 includes the method of any of Clauses 89 to 91, and further includes selecting the acoustic model based on location data indicative of a location of the device.

According to Clause 94, a device includes: means for selecting an acoustic model corresponding to a particular room, of a building, in which the device is located; and means for processing an input audio signal using the acoustic model.

According to Clause 95, a non-transitory computer-readable storage medium includes instructions that, when executed by a processor of a device, cause the processor to: select an acoustic model corresponding to a particular room, of a building, in which the device is located; and process an input audio signal using the acoustic model.

Particular aspects of the disclosure are described below in a seventh set of interrelated clauses:

According to Clause 96, a device includes: one or more processors configured to: in response to the device entering a vehicle, select a personalized acoustic model for a user of the device from among multiple personalized acoustic models corresponding to the vehicle; and process an input audio signal using the personalized acoustic model.

Clause 97 includes the device of Clause 96, wherein the one or more processors are configured to download the personalized acoustic model from a library of acoustic models in response to a determination that the device has entered the vehicle.

Clause 98 includes the device of Clause 96 or Clause 97, wherein the one or more processors are further configured to remove the personalized acoustic model in response to the device leaving the vehicle.

Clause 99 includes the device of any of Clauses 96 to 98, and further includes one or more microphones configured to generate the input audio signal.

Clause 100 includes the device of any of Clauses 96 to 99, and further includes one or more sensor devices coupled to the one or more processors and configured to generate sensor data indicative of a location of the device, and wherein the one or more processors are configured to determine the device has entered the vehicle based on the sensor data.

Clause 101 includes the device of any of Clauses 96 to 100, and further includes a modem coupled to the one or more processors and configured to receive location data indicative of a location of the device, and wherein the one or more processors are configured to determine the device has entered the vehicle based on the location data.

Particular aspects of the disclosure are described below in an eighth set of interrelated clauses:

According to Clause 102, a method includes: selecting, at one or more processors of a device and in response to detecting a user entering a vehicle, a personalized acoustic model for the user from among multiple personalized acoustic models corresponding to the vehicle; and processing, at the one or more processors, an input audio signal using the personalized acoustic model.

Clause 103 includes the method of Clause 102, and further includes downloading the personalized acoustic model from a library of acoustic models in response to a determination that the user has entered the vehicle.

Clause 104 includes the method of Clause 102 or Clause 103, and further includes removing the personalized acoustic model in response to the user leaving the vehicle.

Clause 105 includes the method of any of Clauses 102 to 104, and further includes determining the user has entered the vehicle based on sensor data indicative of a location of the user.

According to Clause 106, a device includes: means for selecting, in response to detecting a user entering a vehicle, a personalized acoustic model for the user from among multiple personalized acoustic models corresponding to the vehicle; and means for processing an input audio signal using the personalized acoustic model.

According to Clause 107, a non-transitory computer-readable storage medium includes instructions that, when executed by a processor of a device, cause the processor to: select, in response to detecting a user entering a vehicle, a personalized acoustic model for the user from among multiple personalized acoustic models corresponding to the vehicle; and process an input audio signal using the personalized acoustic model.

Particular aspects of the disclosure are described below in a ninth set of interrelated clauses:

According to Clause 108, a device includes: one or more processors configured to: download an acoustic model corresponding to a particular location in which the device is located; process an input audio signal using the acoustic model; and remove the acoustic model in response to the device exiting the location.

Clause 109 includes the device of Clause 108, wherein the location corresponds to a particular restaurant, and wherein the acoustic model is downloaded from a library of acoustic models in response to a determination that the device has entered the particular restaurant.

Clause 110 includes the device of Clause 108 or 109, and further includes one or more microphones configured to generate the input audio signal.

Clause 111 includes the device of any of Clauses 108 to 110, and further includes one or more sensor devices coupled to the one or more processors and configured to generate sensor data indicative of a location of the device, and wherein the one or more processors are configured to determine the device has entered the particular location based on the sensor data.

Clause 112 includes the device of any of Clauses 108 to 110, and further includes a modem coupled to the one or more processors and configured to receive location data indicative of a location of the device, and wherein the one or more processors are configured to determine the device has entered the particular location based on the location data.

Particular aspects of the disclosure are described below in a tenth set of interrelated clauses:

According to Clause 113, a method includes: downloading, at one or more processors of a device, an acoustic model corresponding to a particular location in which the device is located; processing, at the one or more processors, an input audio signal using the acoustic model; and removing, at the one or more processors, the acoustic model in response to the device exiting the location.

Clause 114 includes the method of Clause 113, wherein the location corresponds to a particular restaurant, and wherein the acoustic model is downloaded from a library of acoustic models in response to a determination that the device has entered the particular restaurant.

Clause 115 includes the method of Clause 113 or Clause 114, and further includes determining that the device has entered the particular location based on sensor data indicative of a location of the device.

Clause 116 includes the method of Clause 113 or 114, and further includes determining that the device has entered the particular location based on location data indicative of a location of the device.

According to Clause 117, a device includes: means for downloading an acoustic model corresponding to a particular location in which the device is located; means for processing an input audio signal using the acoustic model; and means for removing the acoustic model in response to the device exiting the location.

According to Clause 118, a non-transitory computer-readable storage medium includes instructions that, when executed by a processor of a device, cause the processor to: download an acoustic model corresponding to a particular location in which the device is located; process an input audio signal using the acoustic model; and remove the acoustic model in response to the device exiting the location.

Particular aspects of the disclosure are described below in an eleventh set of interrelated clauses:

According to Clause 119, a device includes: one or more processors configured to: select an acoustic model corresponding to a particular location; receive an access permission for the acoustic model at least partially based on a location of the device matching the particular location; and process an input audio signal using the acoustic model.

Clause 120 includes the device of Clause 119, and further includes a modem, and wherein the one or more processors are further configured to receive the access permission via the modem in response to detection of the device within the particular location.

Particular aspects of the disclosure are described below in a twelfth set of interrelated clauses:

According to Clause 121, a method includes: selecting, at the one or more processors of a device, an acoustic model corresponding to a particular location; receiving, at the one or more processors, an access permission for the acoustic model at least partially based on a location of the device matching the particular location; and processing, at the one or more processors, an input audio signal using the acoustic model.

Clause 122 includes the method of Clause 121, and further includes receiving the access permission in response to detection of the device within the particular location.

According to Clause 123, a device includes: means for selecting an acoustic model corresponding to a particular location; means for receiving an access permission for the acoustic model at least partially based on a location of the device matching the particular location; and means for processing an input audio signal using the acoustic model.

According to Clause 124, a non-transitory computer-readable storage medium includes instructions that, when executed by a processor of a device, cause the processor to: select an acoustic model corresponding to a particular location; receive an access permission for the acoustic model at least partially based on a location of the device matching the particular location; and process an input audio signal using the acoustic model.

Particular aspects of the disclosure are described below in a thirteenth set of interrelated clauses:

According to Clause 125, a device includes one or more processors configured to: detect a context of the device; send a request that indicates the context to a remote device; receive a model corresponding to the context; use the model while the context remains detected; and prune the model in response to detecting a change of the context.

Clause 126 includes the device of Clause 125, wherein the one or more processors are further configured to generate at least one new sound class while the context remains detected, and wherein prune the model includes preserving the at least one new sound class.

Clause 127 includes the device of Clause 125 or Clause 126, wherein prune the model includes permanently deleting the model.

Clause 128 includes the device of any of Clauses 125 to 127, wherein the one or more processors are further configured to receive the model based on private access.

According to Clause 129, a method includes: detecting, at one or more processors of a device, a context of the device; sending a request that indicates the context to a remote device; receiving a model corresponding to the context; using, at the one or more processors, the model while the context remains detected; and pruning, at the one or more processors, the model in response to detecting a change of the context.

Clause 130 includes the method of Clause 129, further comprising generating at least one new sound class while the context remains detected, and wherein pruning the model includes preserving the at least one new sound class.

Clause 131 includes the method of Clause 129 or Clause 130, wherein pruning the model includes permanently deleting the model.

Clause 132 includes the method of any of Clauses 129 to 131, wherein the model is received based on private access.

According to Clause 133, an apparatus includes: means for detecting a context of a device; means for sending a request that indicates the context to a remote device; means for receiving a model corresponding to the context; means for using the model while the context remains detected; and means for pruning the model in response to detecting a change of the context.

According to Clause 134, a non-transitory computer-readable storage medium includes instructions that, when executed by a processor of a device, cause the processor to: detect a context of a device; send a request that indicates the context to a remote device; receive a model corresponding to the context; use the model while the context remains detected; and prune the model in response to detecting a change of the context.

The previous description of the disclosed aspects is provided to enable a person skilled in the art to make or use the disclosed aspects. Various modifications to these aspects will be readily apparent to those skilled in the art, and the principles defined herein may be applied to other aspects without departing from the scope of the disclosure. Thus, the present disclosure is not intended to be limited to the aspects shown herein but is to be accorded the widest scope possible consistent with the principles and novel features as defined by the following claims.

What is claimed is:

1. A device comprising:
   a memory configured to store one or more models; and
   one or more processors coupled to the memory and configured to:
   receive sensor data from one or more sensor devices, wherein the sensor data includes image data from a camera, the image data corresponding to a visual scene;
   determine a context of the device based on the sensor data, the context at least partially based on the visual scene, wherein the context is determined based on a trained classifier that was trained to determine the context based on training sensor data;
   receive results of a query that is based on the context and select a particular model based on the results of the query, the particular model comprising a sound event classification (SEC) model, selection of the particular model causes the device to download the particular model from a cloud-based library of models and store the downloaded particular model to the memory; and
   process an input signal using the particular model to generate a context-specific output.

2. The device of claim 1, further comprising a location sensor coupled to the one or more processors, wherein the sensor data includes location data from the location sensor, the location data indicative of a location of the device, and wherein the context is at least partially based on the location.

3. The device of claim 1, further comprising the camera coupled to the one or more processors.

4. The device of claim 1, further comprising a microphone coupled to the one or more processors, wherein the sensor data includes audio data from the microphone that is distinct from the input signal, the audio data corresponding to an audio scene, and wherein the context is at least partially based on the audio scene.

5. The device of claim 1, further comprising an activity detector coupled to the one or more processors, wherein the sensor data includes motion data from the activity detector, the motion data corresponding to motion of the device, and wherein the context is at least partially based on the motion of the device.

6. The device of claim 1, wherein the input signal includes an audio signal, and the context-specific output includes a classification of a sound event in the audio signal.

7. The device of claim 1, wherein the one or more processors are further configured to select a second particular model based on the query, wherein the second particular model includes an automatic speech recognition model, the input signal includes an audio signal, and the context-specific output includes text data representative of speech in the audio signal.

8. The device of claim 1, wherein the one or more processors are further configured to select a second particular model based on the query, wherein the second particular model includes a natural language processing (NLP) model, the input signal includes text data, and the context-specific output includes NLP output data based on the text data.

9. The device of claim 1, wherein the one or more processors are further configured to select a second particular model based on the query, wherein the second particular model includes a noise reduction model, the input signal includes an audio signal, and the context-specific output includes a noise reduced audio signal based on the audio signal.

10. The device of claim 1, wherein the one or more processors are further configured to select a second particular model based on the query, wherein the second particular model is associated with an automatic adjustment of a device operating mode, and wherein the context-specific output includes a signal to adjust the device operating mode.

11. The device of claim 1, further comprising a modem coupled to the one or more processors and configured to receive the particular model from the library via wireless transmission.

12. The device of claim 11, wherein the context corresponds to a location of the device, and wherein the particular model includes an acoustic model corresponding to a particular location.

13. The device of claim 12, wherein the one or more processors are further configured to receive, via the modem, an access permission for the particular model at least partially based on the location of the device matching the particular location.

14. The device of claim 1, wherein the one or more processors are further configured to prune the particular model in response to determining that the context has changed.

15. The device of claim 1, wherein the one or more processors are integrated in integrated circuit.

16. The device of claim 1, wherein the one or more processors are integrated in a vehicle.

17. The device of claim 1, wherein the one or more processors are integrated in at least one of a mobile phone, a tablet computer device, a virtual reality headset, an augmented reality headset, a mixed reality headset, a wireless speaker device, a wearable device, a camera device, or a hearing aid device.

18. The device of claim 1, wherein the trained classifier comprises an image recognition model that was trained to determine the context based on objects detected in the training sensor data.

19. A method of context-based model selection, comprising:
- receiving, at one or more processors of a device, sensor data from one or more sensor devices, wherein the sensor data includes image data from a camera, the image data corresponding to a visual scene;
- determining, at the one or more processors, a context of the device based on the sensor data, the context at least partially based on the visual scene, wherein the context is determined based on a trained classifier that was trained to determine the context based on training sensor data;
- receiving results of a query that is based on the context and selecting, at the one or more processors, a particular model based on the results of the query, the particular model comprising a sound event classification (SEC) model, selection of the particular model causing the device to download the particular model from a cloud-based library of models and store the downloaded particular model to a memory of the device; and
- processing, at the one or more processors, an input signal using the particular model to generate a context-specific output.

20. The method of claim 19, further comprising receiving the particular model from the library via wireless transmission.

21. The method of claim 19, wherein the context corresponds to a location of the device, and wherein the particular model includes an acoustic model corresponding to a particular location.

22. The method of claim 21, further comprising receiving an access permission for the particular model at least partially based on the location of the device matching the particular location.

23. The method of claim 19, further comprising pruning the particular model in response to determining that the context has changed, wherein pruning the particular model comprises:
- preserving at least one new sound class associated with the context; and
- deleting the particular model from one or more models stored at the memory.

24. The method of claim 19, wherein the library corresponds to a library of shared models.

25. The method of claim 24, wherein the particular model includes a trained model uploaded to the library from another user device.

26. The method of claim 25, wherein the library corresponds to a crowdsourced library of models.

27. The method of claim 25, wherein the library is included in a distributed context-aware system.

28. The method of claim 19, wherein the context includes a particular acoustic environment, and the method further comprising:
- determining whether the library of models includes an acoustic model that is specific to the particular acoustic environment and available to the device; and
- in response to no acoustic model that is specific to the particular acoustic environment being available to the device, determining whether an acoustic model for a general category of the particular acoustic environment is available to the device.

29. A device comprising:
- means for receiving sensor data, the sensor data including image data that corresponds to a visual scene;
- means for determining a context based on the sensor data, the context at least partially based on the visual scene, wherein the context is determined based on a trained classifier that was trained to determine the context based on training sensor data;
- means for receiving results of a query that is based on the context;
- means for selecting a particular model based on the results of the query, the particular model comprising a sound event classification (SEC) model, selection of the particular model causing the device to download the particular model from a cloud-based library of models and store the downloaded particular model; and
- means for processing an input signal using the particular model to generate a context-specific output.

30. A non-transitory computer-readable storage medium comprising instructions that, when executed by a processor, cause the processor to:
- receive sensor data from one or more sensor devices wherein the sensor data includes image data from a camera, the image data corresponding to a visual scene;
- determine a context based on the sensor data, the context at least partially based on the visual scene, wherein the context is determined based on a trained classifier that was trained to determine the context based on training sensor data;
- receive results of a query that is based on the context and select a particular model based on the results of the query, the particular model comprising a sound event classification (SEC) model, a noise reduction model, selection of the particular model causes the processor to download the particular model from a cloud-based library of models and store the downloaded particular model to a memory that is coupled to the processor; and
- process an input signal using the particular model to generate a context-specific output.

* * * * *